US011026256B2

(12) United States Patent
Suzuki et al.

(10) Patent No.: US 11,026,256 B2
(45) Date of Patent: Jun. 1, 2021

(54) TERMINAL APPARATUS, BASE STATION APPARATUS, AND COMMUNICATION METHOD

(71) Applicants: Sharp Kabushiki Kaisha, Sakai (JP); FG Innovation Company Limited, New Territories (HK)

(72) Inventors: Shoichi Suzuki, Sakai (JP); Tatsushi Aiba, Sakai (JP); Kimihiko Imamura, Sakai (JP); Wataru Ouchi, Sakai (JP); Takashi Hayashi, Sakai (JP); Tomoki Yoshimura, Sakai (JP); Liqing Liu, Sakai (JP)

(73) Assignees: SHARP KABUSHIKI KAISHA, Sakai (JP); FG INNOVATION COMPANY LIMITED, New Territories (HK)

(*) Notice: Subject to any disclaimer, the term of this patent is extended or adjusted under 35 U.S.C. 154(b) by 39 days.

(21) Appl. No.: 16/095,713

(22) PCT Filed: Apr. 24, 2017

(86) PCT No.: PCT/JP2017/016227
§ 371 (c)(1),
(2) Date: Oct. 23, 2018

(87) PCT Pub. No.: WO2017/188188
PCT Pub. Date: Nov. 2, 2017

(65) Prior Publication Data
US 2019/0141736 A1 May 9, 2019

(30) Foreign Application Priority Data

Apr. 28, 2016 (JP) .............................. JP2016-090467

(51) Int. Cl.
*H04W 72/14* (2009.01)
*H04W 24/10* (2009.01)
(Continued)

(52) U.S. Cl.
CPC ........... *H04W 72/14* (2013.01); *H04L 1/1812* (2013.01); *H04L 1/1893* (2013.01);
(Continued)

(58) Field of Classification Search
CPC ..... H04W 72/14; H04W 72/04; H04W 72/12; H04W 72/0453; H04W 72/0446;
(Continued)

(56) References Cited

U.S. PATENT DOCUMENTS

2017/0273071 A1* 9/2017 Nogami .............. H04W 74/085
2018/0132268 A1* 5/2018 Zhang ............... H04W 72/1284
(Continued)

FOREIGN PATENT DOCUMENTS

WO    2016/048595 A1    3/2016

OTHER PUBLICATIONS

Hwang et al., "Periodic CSI Reporting with Multiple TTI", U.S. Appl. No. 62/269,101, filed Dec. 18, 2015 (Year: 2015).*
(Continued)

*Primary Examiner* — Thinh D Tran
(74) *Attorney, Agent, or Firm* — Keating & Bennett, LLP

(57) ABSTRACT

The terminal apparatus 1 receives an uplink grant to be used for scheduling a PUSCH in the serving cell and an uplink grant to be used for scheduling a sPUSCH in the serving cell, transmits a periodic channel state information report using a PUCCH in the serving cell, transmits the periodic channel state information report using the PUSCH in a subframe in which the PUSCH is scheduled, and does not transmit the periodic channel state information report using the sPUSCH in a subframe in which the sPUSCH is scheduled. According to the present invention, the terminal apparatus 1 can efficiently transmit the uplink control information. Also, the base station apparatus 3 can efficiently receive the uplink control information.

4 Claims, 16 Drawing Sheets

(51) Int. Cl.
  *H04W 72/12* (2009.01)
  *H04W 72/04* (2009.01)
  *H04L 1/18* (2006.01)
  *H04L 5/00* (2006.01)

(52) U.S. Cl.
  CPC .......... *H04L 5/0048* (2013.01); *H04L 5/0055* (2013.01); *H04W 24/10* (2013.01); *H04W 72/04* (2013.01); *H04W 72/0446* (2013.01); *H04W 72/0453* (2013.01); *H04W 72/12* (2013.01)

(58) Field of Classification Search
  CPC .... H04W 24/10; H04L 5/0055; H04L 5/0048; H04L 1/1893; H04L 1/1812; H04L 5/0053; H04L 5/0007
  See application file for complete search history.

(56) References Cited

U.S. PATENT DOCUMENTS

| | | | | |
|---|---|---|---|---|
| 2018/0375619 | A1* | 12/2018 | Hwang | H04B 7/26 |
| 2019/0098622 | A1* | 3/2019 | Lee | H04W 72/042 |
| 2019/0110311 | A1* | 4/2019 | Falconetti | H04L 5/0082 |

OTHER PUBLICATIONS

LEE et al. "Method and System for Uplink Physical Channels to reduce latency in an LTE Advanced System", U.S. Appl. No. 62/315,490, filed Mar. 30, 2016 (Year: 2016).*

Falconetti et al., "Collision Handling Between Legacy TTI and Short TTI", U.S. Appl. No. 62/316,964, filed Apr. 1, 2016 (Year: 2016).*

Ericsson, "Physical layer aspects for PUSCH for short TTI", 3GPP TSG RAN WG1 Meeting #84bis, R1-163320, Apr. 11-15, 2016, pp. 1-3.

Ericsson et al., "New SI proposal: Study on Latency reduction techniques for LTE", 3GPP TSG RAN Meeting #67, RP-150465, Mar. 9-12, 2015, 7 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0, Dec. 2015, pp. 1-290.

"3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, pp. 1-361.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.

Ericsson, "Physical layer aspects for PUCCH for short TTI", 3GPP TSG RAN WG1 Meeting #84 bis, R1-163321, Apr. 11-15, 2016, pp. 1-3.

LG Electronics, "Discussion on PUSCH design with TTI shortening", 3GPP TSG RAN WG1 Meeting #84bis, R1-162509, Apr. 11-15, 2016, 10 pages.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas each covered by the base station apparatus are deployed to form a cellular structure. A single base station apparatus may manage multiple cells.

In LTE Release 13, transmission of uplink control information using PUSCH and PUCCH is standardized. (NPLs 1, 2, 3, 4). In NPL 5, shortening of TTI (Transmission Time Interval) and reduction of processing time are studied. In NPL 6, transmission of channel state information and HARQ-ACK (Hybrid Automatic Repeat reQuest-ACKnowledgment) using sPUCCH and sPUSCH is studied.

CITATION LIST

Non Patent Literature

NPL 1: "3GPP TS 36.211 V13.1.0 (2016-03)", 29 Mar., 2016.

NPL 2: "3GPP TS 36.212 V13.1.0 (2016-03)", 29 Mar., 2016.

NPL 3: "3GPP TS 36.213 V13.1.1 (2016-03)", 31 Mar., 2016.

NPL 4: "3GPP TS 36.300 V13.2.0 (2015-12)", 13 Jan., 2015.

NPL 5: "New SI proposal: Study on Latency reduction techniques for LTE", RP-150465, Ericsson, Huawei, 3 GPP TSG RAN Meeting #67, Shanghai, China, 9-12 Mar. 2015.

NPL 6: "Physical layer aspects for PUSCH for short TTI", R1-163320, Ericsson, 3GPP TSG RAN WG1 Meeting #84 bis, Busan, 11-15 Apr. 2016.

SUMMARY OF INVENTION

Technical Problem

The present invention provides a terminal apparatus capable of efficiently transmitting uplink control information, a communication method to be used by the terminal apparatus, a base station apparatus capable of efficiently receiving uplink control information, and a communication method to be used by the base station apparatus.

Solution to Problem (1) According to some aspects of the present invention, the following measures are provided. Namely, a first aspect of the present invention is a terminal apparatus for communicating with a base station apparatus using at least one serving cell, the terminal apparatus including, a receiver configured to receive an uplink grant to be used for scheduling a PUSCH in the serving cell and an uplink grant to be used for scheduling an sPUSCH in the serving cell, and a transmitter configured to transmit a periodic channel state information report using a PUCCH in the serving cell, wherein the transmitter further transmits the periodic channel state information report using the PUSCH in a subframe in which the PUSCH is scheduled, and does not transmit the periodic channel state information report using the sPUSCH in a subframe in which the sPUSCH is scheduled.

(2) A second aspect of the present invention is a base station apparatus for communicating with a terminal apparatus using at least one serving cell, the base station apparatus including, a transmitter configured to transmit an uplink grant to be used for scheduling a PUSCH in the serving cell and an uplink grant to be used for scheduling an sPUSCH in the serving cell, and a receiver configured to receive a periodic channel state information report using a PUCCH in the serving cell, wherein the receiver further receives the periodic channel state information report using the PUSCH in a subframe in which the PUSCH is scheduled, and does not receive the periodic channel state information report using the sPUSCH in a subframe in which the sPUSCH is scheduled.

(3) A third aspect of the present invention is a communication method for a terminal apparatus to communicate with a base station apparatus using at least one serving cell, the method including the steps of, receiving an uplink grant to be used for scheduling a PUSCH in the serving cell and an uplink grant to be used for scheduling an sPUSCH in the serving cell, transmitting a periodic channel state information report using a PUCCH in the serving cell, transmitting the periodic channel state information report using the PUSCH in a subframe in which the PUSCH is scheduled, and not transmitting the periodic channel state information report using the sPUSCH in a subframe in which the sPUSCH is scheduled.

(4) A fourth aspect of the present invention is a communication method for a terminal apparatus to communicate with a base station apparatus using at least one serving cell, the method including the steps of, receiving an uplink grant to be used for scheduling a PUSCH in the serving cell and an uplink grant to be used for scheduling an sPUSCH in the serving cell, transmitting a periodic channel state information report using a PUCCH in the serving cell, transmitting the periodic channel state information report using the PUSCH in a subframe in which the PUSCH is scheduled, and not transmitting the periodic channel state information report using the sPUSCH in a subframe in which the sPUSCH is scheduled.

Advantageous Effects of Invention

According to the present invention, a terminal apparatus can transmit uplink control information efficiently. In addition, a base station apparatus can receive uplink control information efficiently.

DESCRIPTION OF EMBODIMENTS

Embodiments of the present invention will be described below.

Figure 1:
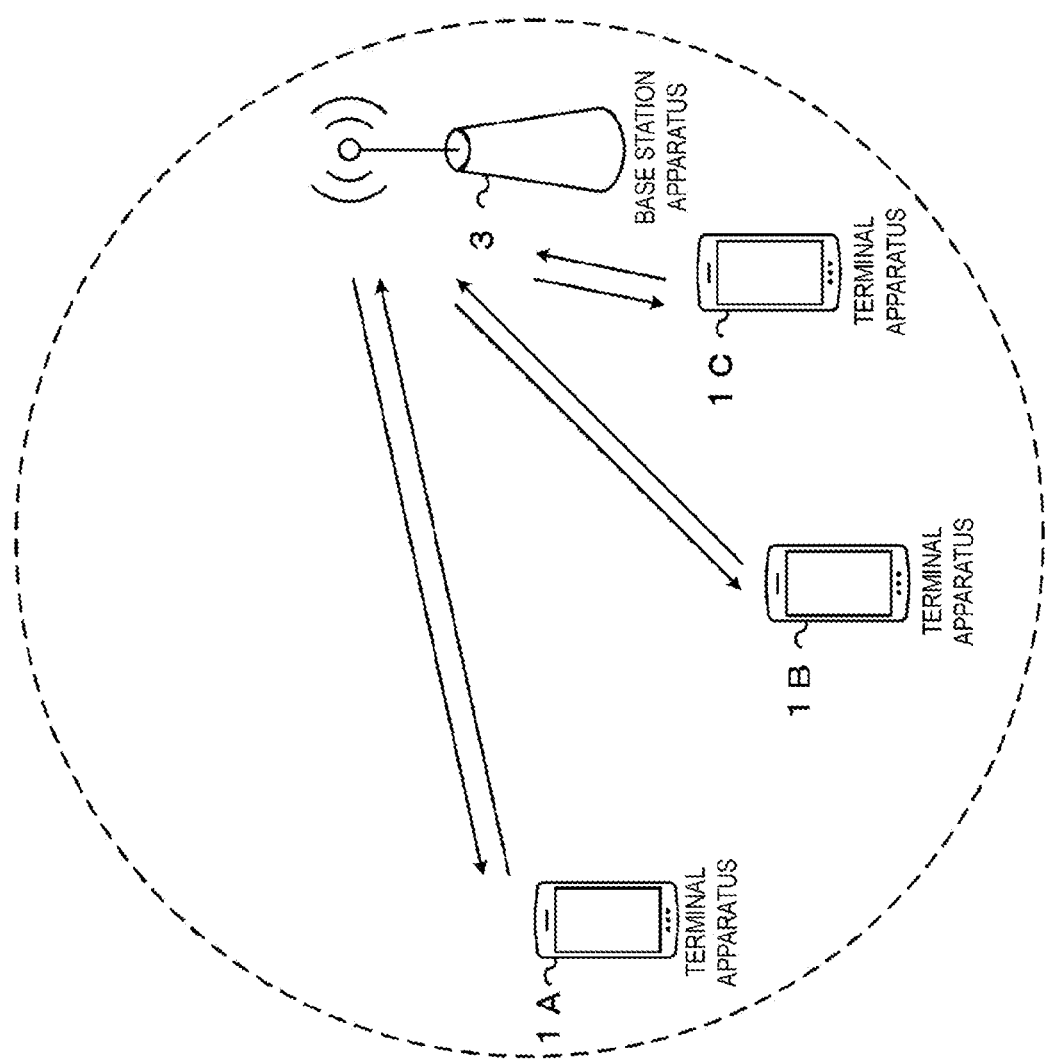
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Each of the terminal apparatuses 1A to 1C is referred to as a terminal apparatus 1 below.

Now, carrier aggregation will be described.

In the present embodiment, a plurality of serving cells are configured for the terminal apparatus 1. A technology in which the terminal apparatus 1 communicates via the plurality of serving cells is referred to as cell aggregation or carrier aggregation. The present invention may be applied to each of the plurality of serving cells configured for the terminal apparatus 1. Furthermore, the present invention may be applied to some of the plurality of serving cells configured. Furthermore, the present invention may be applied to each of groups of the plurality of serving cells configured. Furthermore, the present invention may be applied to some of the groups of the plurality of serving cells configured.

The plurality of serving cells include at least one primary cell. The plurality of serving cells may include at least one of a plurality of secondary cells. The primary cell is a serving cell in which an initial connection establishment procedure has been performed, a serving cell in which a connection re-establishment procedure has been started, or a cell indicated as a primary cell during a handover procedure.

A secondary cell may be configured at or after the point of time a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on a plurality of physical channels in a plurality of serving cells (component careers). A single physical channel is transmitted in a single serving cell (component carrier) of a plurality of serving cells (component carriers).

Physical channels and physical signals according to the present embodiment will be described.

In FIG. 1, the following uplink physical channels are used for uplink radio communication from the terminal apparatus 1 to the base station apparatus 3. The uplink physical channels are used for transmitting information output from higher layers.

Physical Uplink Control Channel (PUCCH)
shortened Physical Uplink Control Channel (sPUCCH)
Physical Uplink Shared Channel (PUSCH)
shortened Physical Uplink Shared Channel (sPUSCH)

The PUCCH and the sPUCCH are used for transmitting Uplink Control Information (UCI). In the present embodiment, the terminal apparatus 1 may perform a transmission of PUCCH only in the primary cell. The uplink control information includes: downlink channel state information (CSI); a scheduling request (SR) indicating a request for a PUSCH resource; and a hybrid automatic repeat request acknowledgement (HARQ-ACK) for downlink data (a transport block, a medium access control protocol data unit (MAC PDU), a downlink-shared channel (DL-SCH), or a physical downlink shared channel (PDSCH)). The HARQ-ACK indicates an acknowledgement (ACK) or a negative-acknowledgement (NACK). The HARQ-ACK is also referred to as ACK/NACK, HARQ feedback, HARQ-ACK feedback, HARQ response, HARQ-ACK response, HARQ information, HARQ-ACK information, HARQ control information, or HARQ-ACK control information.

PUSCH and sPUSCH may be used to transmit uplink data (Transport block, Medium Access Control Protocol Data Unit: MAC PDU, Uplink-Shared Channel: UL-SCH). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

An aperiodic channel state information report is triggered by a field included in the uplink grant corresponding to PUSCH/sPUSCH transmission. A periodic channel state information report is triggered by RRC signaling (higher layer parameters). The PUSCH is used for the aperiodic channel state information report. The PUSCH or PUCCH is used for the periodic channel state information report.

In FIG. 1, the following downlink physical channels are used for downlink radio communication from the base station apparatus 3 to the terminal apparatus 1. The downlink physical channels are used for transmitting information output from higher layers.

Physical Downlink Control Channel (PDCCH)
Enhanced Physical Downlink Control Channel (EPDCCH)

shortened Physical Downlink Control Channel (sPDCCH)

Physical Downlink Shared Channel (PDSCH)

shortened Physical Downlink Shared Channel (sPDSCH)

The PDCCH, the EPDCCH, and the sPDCCH are used for transmitting Downlink Control Information (DCI). The Downlink Control Information is also referred to as a DCI format. The Downlink Control Information includes a downlink grant and an uplink grant. The downlink grant is also referred to as downlink assignment or downlink allocation.

One downlink grant is used for scheduling one PDSCH within one serving cell. The downlink grant may be used for scheduling the PDSCH within the same subframe as the subframe in which the downlink grant has been transmitted. One downlink grant is used for scheduling one sPDSCH within one serving cell. The downlink grant may be used for scheduling the sPDSCH within the same sTTI as the sTTI (shortened transmission time interval) in which the downlink grant was transmitted.

One uplink grant may be used for scheduling one PUSCH within one cell. The uplink grant may be used for scheduling one PUSCH within the fourth or later subframe after the subframe in which the uplink grant was transmitted. One uplink grant may be used for scheduling one PUSCH within one cell. The uplink grant may be used for scheduling one sPUSCH in a sTTI after the sTTI in which the uplink grant was transmitted.

The PDSCH and the sPDSCH are used for transmitting downlink data (Downlink Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to modulation processing and coding processing for each codeword. One codeword is mapped to one or a plurality of layers.

Figure 2:
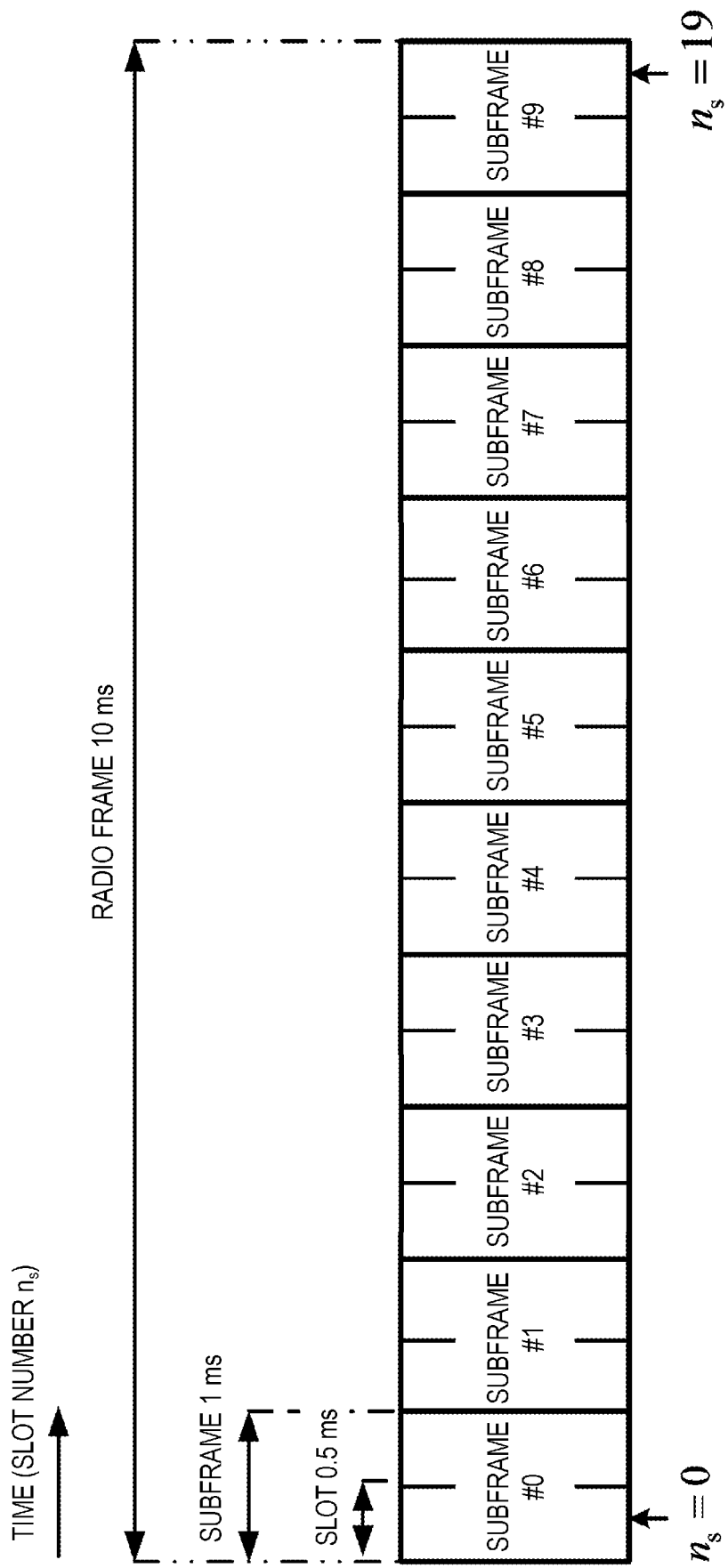
FIG. 2 is a diagram illustrating a schematic configuration of a radio frame according to the present embodiment.

An example of the configuration of the radio frame according to the present embodiment will be described below. FIG. 2 is a diagram illustrating a schematic configuration of a radio frame according to the present embodiment. Each of the radio frames is 10 ms in length. In FIG. 2, the horizontal axis is a time axis. Each of the radio frames consists of 10 subframes. Each of the subframes is 1 ms in length and is defined by two consecutive slots. Each of the slots is 0.5 ms in length. Namely, 10 subframes can be used at each interval of 10 ms. A subframe is also referred to as a Transmission Time Interval (TTI).

Figure 3:
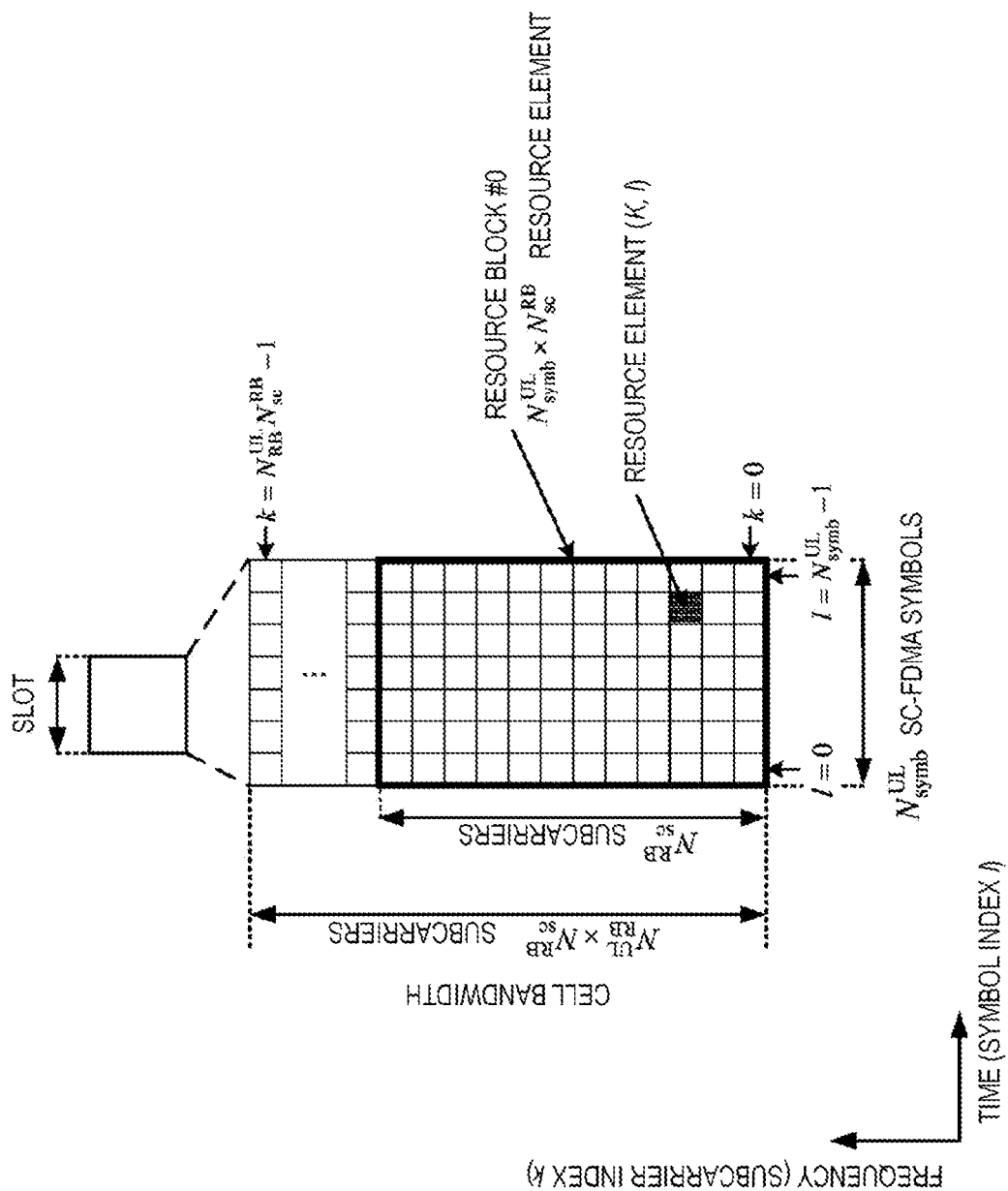
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in one cell. In FIG. 3, the horizontal axis is a time axis, and the vertical axis is a frequency axis. In FIG. 3, 1 is a SC-FDMA symbol number/index, and k is a subcarrier number/index.

The physical signal or the physical channel transmitted in each of the slots is expressed by a resource grid. In the uplink, the resource grid is defined by a plurality of subcarriers and a plurality of SC-FDMA symbols. Each element within the resource grid is referred to as a resource element.

The resource element is expressed by a subcarrier number/index k and an SC-FDMA symbol number/index 1.

The uplink slot includes a plurality of SC-FDMA symbols 1 (1=0, 1, . . . , and $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP, $N^{UL}_{symb}$ is 6.

The terminal apparatus 1 receives the parameter UL-CyclicPrefixLength for indicating the CP length in the uplink from the base station apparatus 3. The base station apparatus 3 may broadcast, in a cell, system information including the parameter UL-CyclicPrefixLength corresponding to the cell.

The uplink slot includes a plurality of subcarriers k (k=0, 1, . . . , $N^{UL}_{RB} \times N^{RB}_{sc}$) in the frequency domain. $N^{UL}_{RB}$ is an uplink bandwidth configuration for a serving cell, which is expressed by a multiple of $N^{RB}_{sc}$. $N^{RB}_{sc}$ is a (physical) resource block size in the frequency domain, which is expressed by the number of subcarriers. A subcarrier spacing Δf is 15 kHz and $N^{RB}_{sc}$ may be twelve. Namely, $N^{RB}_{sc}$ may be 180 kHz. The subcarrier spacing Δf may be different for each channel and/or for each TTI/sTTI.

The resource block is used to express mapping of a physical channel to resource elements. A virtual resource block and a physical resource block are defined for the resource block. The physical channel is first mapped to the virtual resource block. Thereafter, the virtual resource block is mapped to the physical resource block. One physical resource block is defined by $N^{UL}_{symb}$ contiguous SC-FDMA symbols in the time domain and by $N^{RB}_{sc}$ contiguous subcarriers in the frequency domain. Hence, one physical resource block consists of ($N^{UL}_{symb} \times N^{RB}_{sc}$) resource elements. One physical resource block corresponds to one slot in the time domain. The physical resource blocks are numbered/indexed (0, 1, . . . , $N^{UL}_{RB}-1$) in an order starting from a lower frequency in the frequency domain.

The downlink slot according to the present embodiment includes a plurality of OFDM symbols. Since the configuration of the downlink slot according to the present embodiment is basically the same except that the resource grid is defined by a plurality of subcarriers and a plurality of OFDM symbols, the description of the configuration of the downlink slot is omitted.

Figure 4:
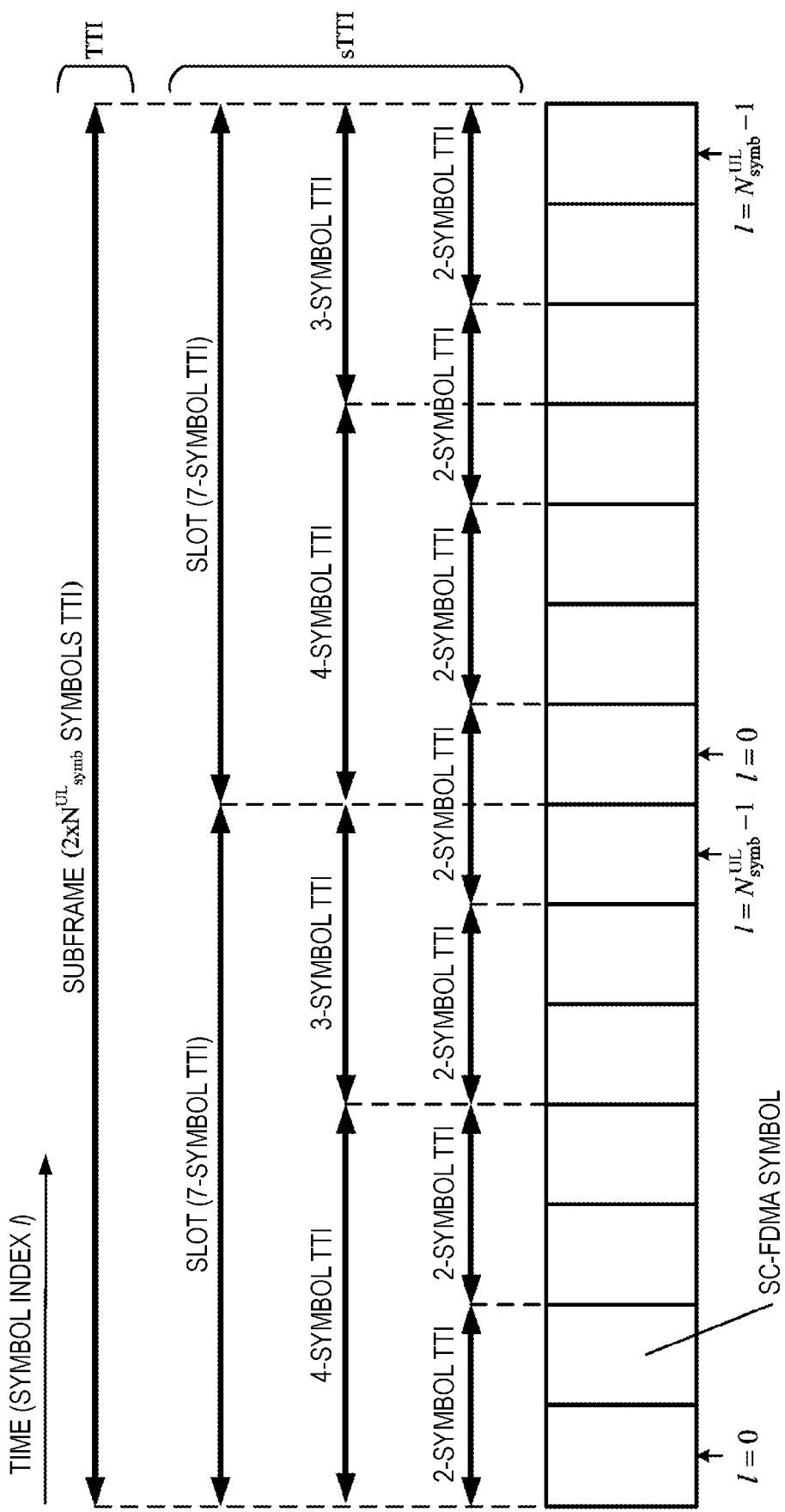
FIG. 4 is a diagram illustrating an example of TTI and sTTI according to the present embodiment.

FIG. 4 is a diagram illustrating an example of TTI and sTTI according to the present embodiment. The TTI may be constituted by $2 \times N^{UL}_{symb}$ SC-FDMA symbols. The number of SC-FDMA symbols constituting the sTTI is any one of {2, 3, 4, 7}. TTI/sTTI constituted by X SC-FDMA symbols is also referred to as X symbol TTI. In the downlink, the TTI and the sTTI may be constituted by a plurality of OFDM symbols.

Figure 5:
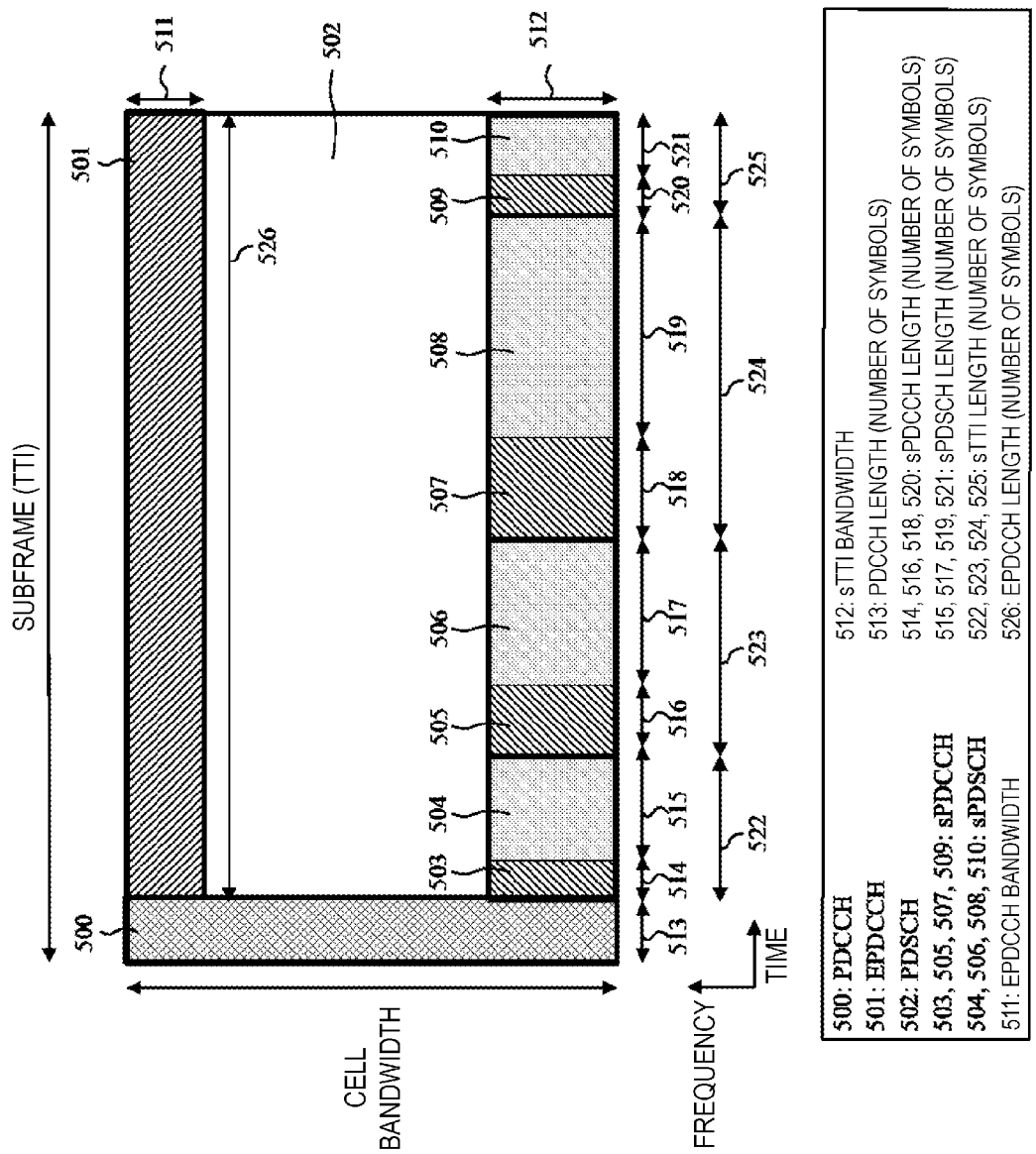
FIG. 5 is a diagram illustrating an example of allocation of a physical channel in the downlink according to the present embodiment.

FIG. 5 is a diagram illustrating an example of allocation of the physical channels in the downlink according to the present embodiment.

The length of the sPUCCH and the length of the sPUSCH may be individually controlled. The length of the sPUCCH may be determined based on the information transmitted on the sPUCCH. The length of the sPUSCH may be determined based on the information transmitted on the sPUSCH.

Figure 6:
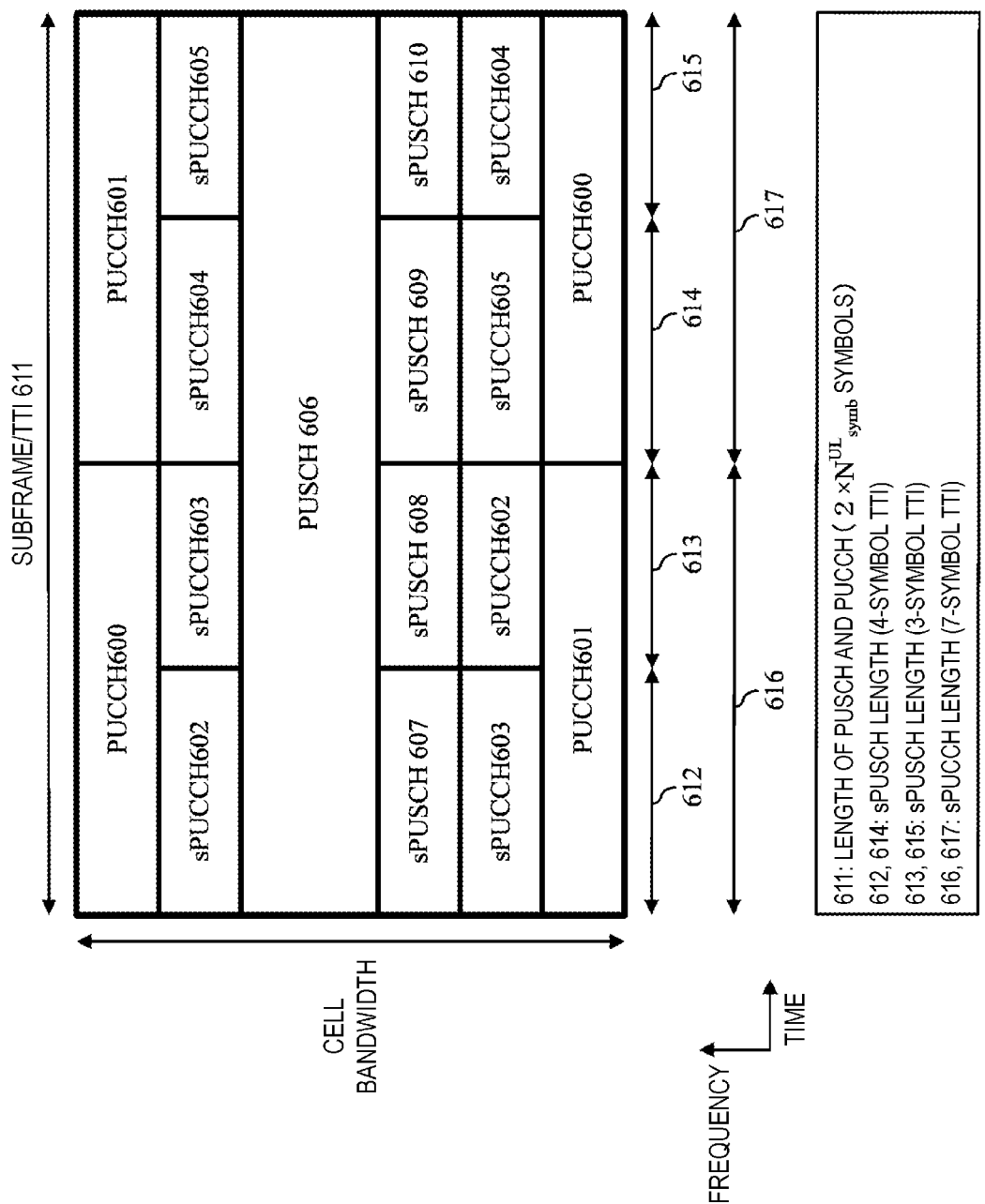
FIG. 6 is a diagram illustrating an example of allocation of a physical channel in the uplink in according to the present embodiment.

FIG. 6 is a diagram illustrating an example of allocation of the physical channel in the uplink according to the present embodiment. Frequency hopping is applied to PUCCH 600, 601, and sPUCCH 602-605. In subframe/TTI, the PUSCH and the PUCCH may be mapped to $2 \times N^{UL}_{symb}$ SC-FDMA symbols. In a 4 symbol TTI, the sPUSCH may be mapped to 4 SC-FDMA symbols. In a 3 symbol TTI, the sPUSCH may be mapped to 3 SC-FDMA symbols. In a 7 symbol TTI, the sPUCCH may be mapped to 7 SC-FDMA symbols. The sPUSCH mapped to the X SC-FDMA symbols in the X symbol TTI is also referred to as the X symbol sPUSCH. The sPUCCH mapped to the X SC-FDMA symbols in the X symbol TTI is also referred to as the X symbol sPUCCH.

Hereinafter, the apparatus configuration of the terminal apparatus 1 of the present invention will be described.

Figure 7:
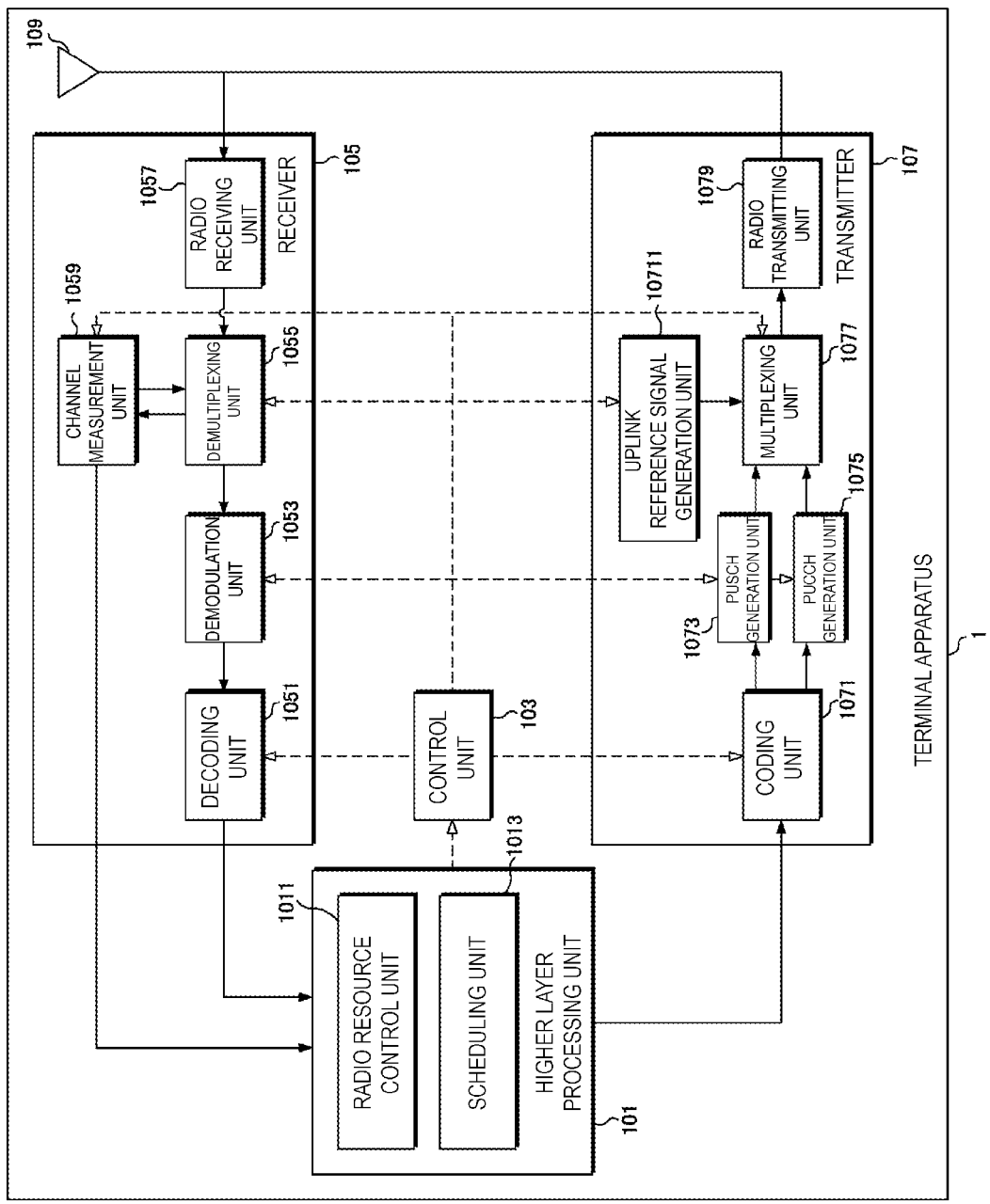
FIG. 7 is a schematic block diagram illustrating a configuration of a terminal apparatus 1 according to the present invention.

FIG. 7 is a schematic block diagram illustrating a configuration of the terminal apparatus 1 according to the present invention. As illustrated, the terminal apparatus 1 is configured to include a higher layer processing unit 101, a control unit 103, a receiver 105, a transmitter 107, and a transmit and/or receive antenna 109. The higher layer processing unit 101 is configured to include a radio resource control unit 1011, and a scheduling unit 1013. The receiver 105 is configured to include a decoding unit 1051, a demodulation unit 1053, a demultiplexing unit 1055, a radio receiving unit 1057, and a channel measurement unit 1059. The transmitter 107 is configured to include a coding unit 1071, a PUSCH generation unit 1073, a PUCCH generation unit 1075, a multiplexing unit 1077, a radio transmitting unit 1079, and an uplink reference signal generation unit 10711.

The higher layer processing unit 101 outputs the uplink data generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates control information for controlling the receiver 105 and the transmitter 107 based on downlink control information and the like, and outputs the generated control information to the control unit 103.

The radio resource control unit 1011 included in the higher layer processing unit 101 manages various types of configuration information of its own apparatus. For example, the radio resource control unit 1011 manages the configured serving cell. Furthermore, the radio resource control unit 1011 generates information to be allocated to each uplink channel, and outputs the generated information to the transmitter 107. In a case that the received downlink data is successfully decoded, the radio resource control unit 1011 generates an ACK and outputs the ACK to the transmitter 107, and in a case that the decoding of the received downlink data fails, the radio resource control unit 1011 generates an NACK and outputs the NACK to the transmitter 107.

The scheduling unit 1013 included in the upper layer processing unit 101 stores the downlink control information received via the receiver 105. The scheduling unit 1013 controls the transmitter 107 via the control unit 103 such that the PUSCH is transmitted according to the received uplink grant in the fourth subframe after the subframe in which the uplink grant is received. The scheduling unit 1013 controls the receiver 105 via the control unit 103 such that the PDSCH is received according to the received downlink grant in the subframe that received the downlink grant.

The control unit 103 generates a control signal for controlling the receiver 105 and the transmitter 107 in accordance with the control information from the higher layer processing unit 101. The control unit 103 outputs the generated control signal to the receiver 105 and the transmitter 107 to control the receiver 105 and the transmitter 107.

The receiver 105 demultiplexes, demodulates, and decodes a reception signal received from the base station apparatus 3 through the transmit and/or receive antenna 109, in accordance with the control signal input from the control unit 103, and outputs the decoded information to the higher layer processing unit 101.

The radio receiving unit 1057 orthogonally demodulates the downlink signal received through the transmit and/or receive antenna 109 and converts the orthogonally demodulated analog signal into a digital signal. The radio receiver 1057 performs Fast Fourier Transform (FFT) on the digital signal and extracts a signal in the frequency domain.

The demultiplexing unit 1055 demultiplexes the extracted signal into PDCCH, PDSCH, and the downlink reference signal, respectively. The demultiplexing unit 1055 outputs the downlink reference signal demultiplexed from the extracted signal to the channel measurement unit 1059.

The demodulation unit 1053 demodulates PDCCH and PDSCH in compliance with a modulation scheme such as QPSK, 16 Quadrature Amplitude Modulation (QAM), or 64 QAM, and performs an output to the decoding unit 1051.

The decoding unit 1051 decodes the downlink data, and outputs the decoded downlink data to the higher layer processing unit 101. The channel measurement unit 1059 calculates a downlink channel estimate value from the downlink reference signal and outputs the calculated downlink channel estimate value to the demultiplexing unit 1055. The channel measurement unit 1059 calculates the channel state information and outputs the channel state information to the upper layer processing unit 101.

The transmitter 107 generates the uplink reference signal in accordance with the control signal input from the control unit 103, codes and modulates the uplink data and uplink control information input from the higher layer processing unit 101, multiplexes the PUCCH, the PUSCH, and the generated uplink reference signal, and performs a transmission to the base station apparatus 3 through the transmit and/or receive antenna 109.

The coding unit 1071 performs coding of the Uplink Control Information and the uplink data that are input from the higher layer processing unit 101, and outputs the coding bits to the PUSCH generation unit and/or the PUCCH generation unit.

Figure 8:
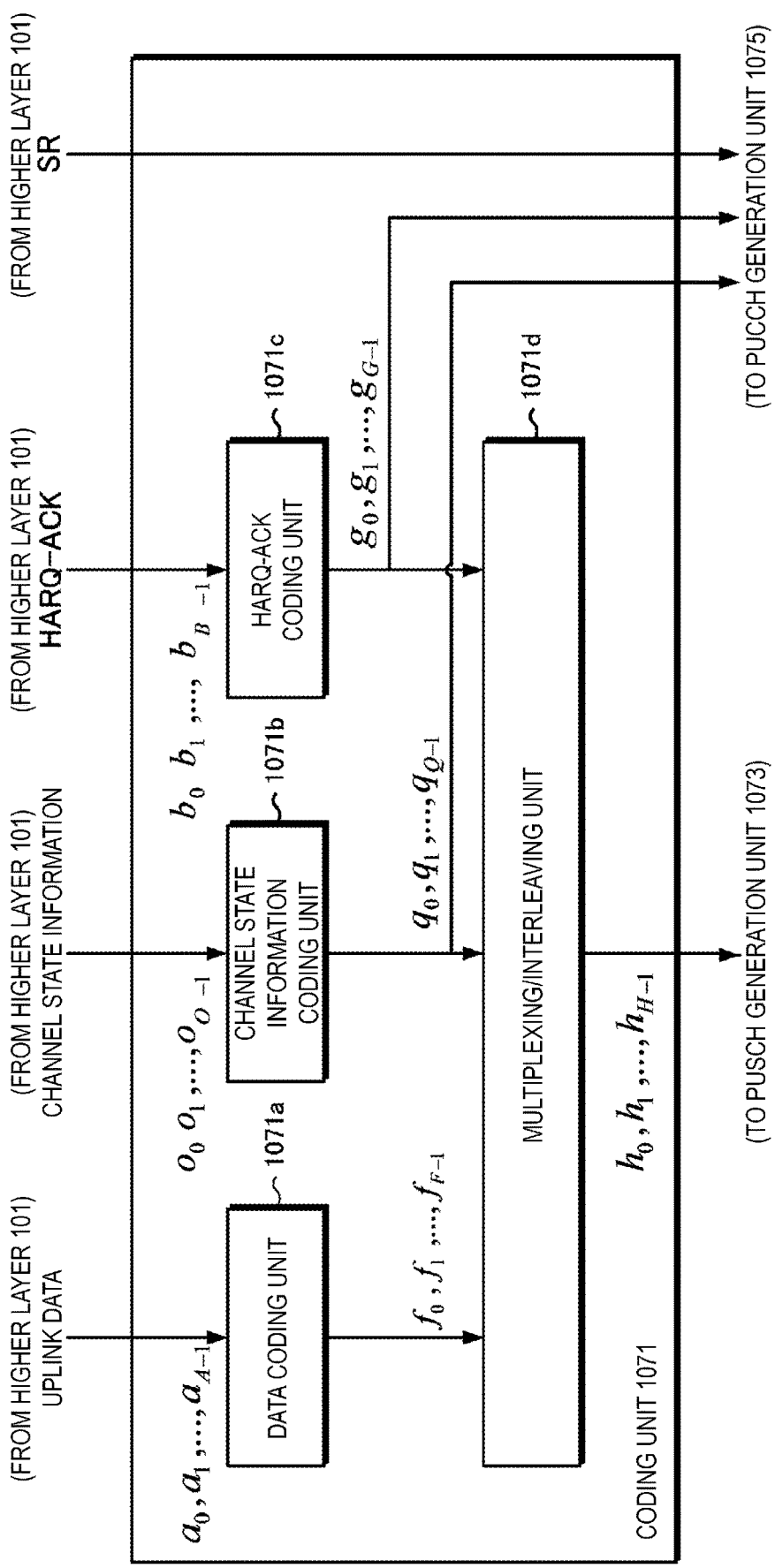
FIG. 8 is a schematic block diagram illustrating a configuration of a coding unit 1071 according to the present invention.

FIG. 8 is a schematic block diagram illustrating a configuration of the coding unit 1071 according to the present invention. The coding unit 1071 includes a data coding unit 1071a, a channel state information coding unit 1071b, a HARQ-ACK coding unit 1071c, and a multiplexing/interleaving unit 1071d.

The data coding unit 1071a adds a CRC parity bit generated from the uplink data to the uplink data a, input from the upper layer 101 and performs error correction coding of the uplink data to which the CRC parity bit has been added, and outputs the coding bits $f_i$, of the uplink data to the multiplexing/interleaving unit 1071d. A is the payload size (number of bits) of the uplink data. F is the number of coding bits of the uplink data.

The channel state information coding unit 1071b performs coding of the channel state information $o_i$. In a case that the channel state information is transmitted using the PUSCH, the channel state information coding unit 1071b outputs the coding bits $q_i$ of the channel state information to the multiplexing/interleaving unit 1071d. In a case that the channel state information is transmitted using the PUCCH, the channel state information coding unit 1071b outputs the coding bits $q_i$, of the channel state information to the PUCCH generating unit 1075. O is the number of bits of the channel state information. Q is the number of coding bits of the channel state information.

The HARQ-ACK coding unit 1071c performs coding of HARQ-ACKb$_i$. In a case that the HARQ-ACK is transmitted using the PUSCH, the HARQ-ACK coding unit 1071c outputs the coding bits g$_i$ of the HARQ-ACK to the multiplexing/interleaving unit 1071d. In a case that the HARQ-ACK is transmitted using the PUCCH, the HARQ-ACK coding unit 1071c outputs the coding bits g$_i$ of the HARQ-ACK to the PUCCH generation unit 1075. B is the number of bits of HARQ-ACK. G is the number of coding bits of HARQ-ACK.

The coding unit 1071 outputs the SR to the PUCCH generating unit 1075.

The multiplexing/interleaving unit 1071d multiplexes and interleaves the coding bits f$_i$ of the uplink data, the coding bits q$_i$ of the channel state information and/or the coding bits g$_i$ of the HARQ-ACK, and outputs the concatenated coding bits h$_i$ to the PUSCH generation unit 1073.

Figure 9:
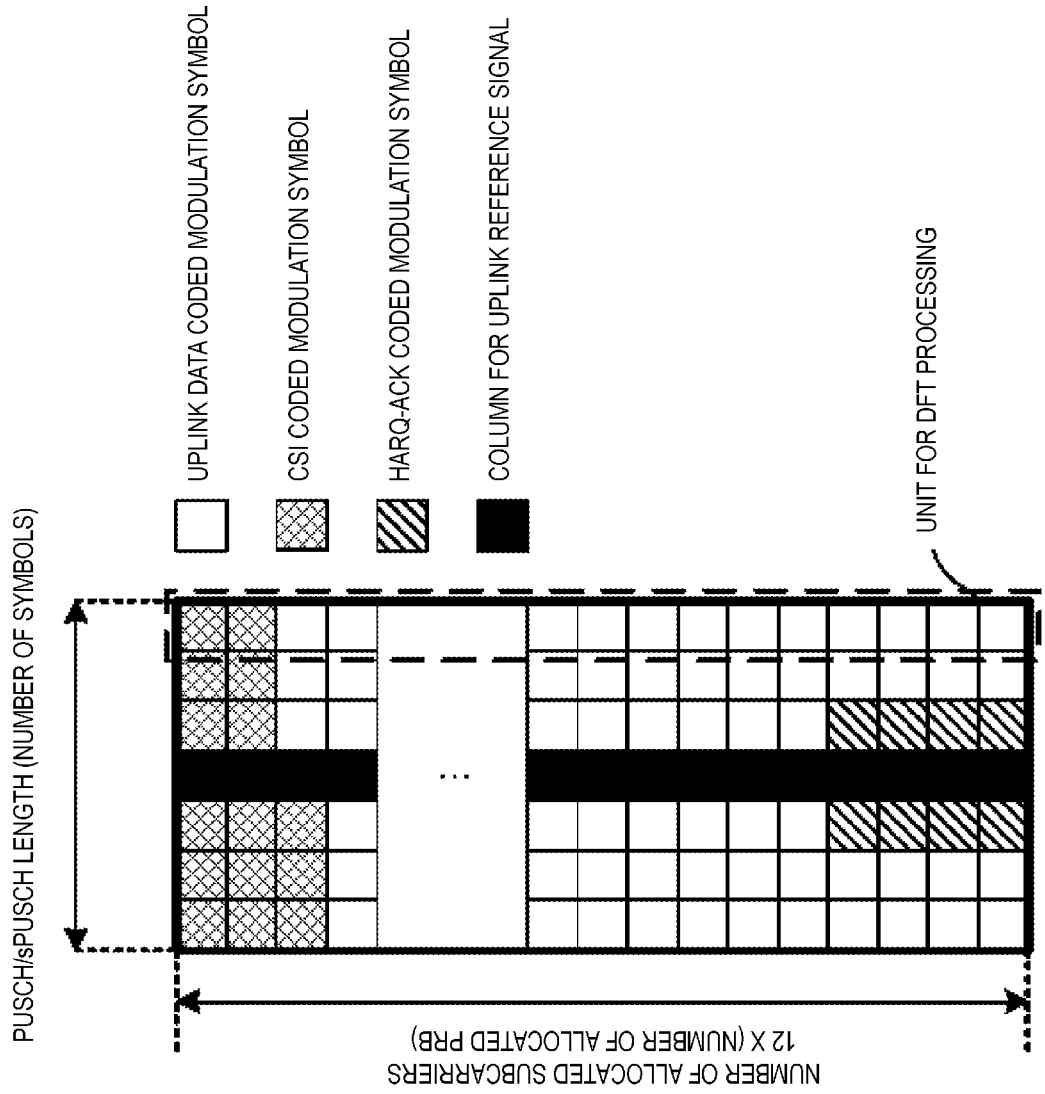
FIG. 9 is a diagram illustrating an example of a method of interleaving coded modulation symbols according to the present embodiment.

FIG. 9 is a diagram illustrating an example of the method of interleaving coded modulation symbols according to the present embodiment. The coded modulation symbols include a group of coding bits. One modulation symbol is generated by modulating one coding symbol. One coded modulation symbol includes the same number of coding bits as the modulation order Q$_m$ of the modulation scheme for the uplink data.

In FIG. 9, there are as many columns as the number of SC-FDMA symbols to which the PUSCH/sPUSCH is mapped. However, since the fourth SC-FDMA symbol is used for transmitting the uplink reference signal, no coded modulation symbol is allocated in the fourth column. In FIG. 9, there are as many rows as the number of PUSCH/sPUSCH subcarriers whose allocation is indicated by the uplink grant.

In the PUSCH signal generation unit 1073, the plurality of modulation symbols corresponding to the coded modulation symbols allocated in the same column in FIG. 9 are together subjected to discrete Fourier transformation (Transform Precoding), and the signal processed by DFT is mapped in the resource element of the PUSCH/sPUSCH whose radio resource allocation is indicated by the uplink grant. The signal generated from the coding symbol in the i$^{th}$ column and processed by DFT is mapped in the resource element corresponding to the i$^{th}$ SC-FDMA symbol.

The PUSCH generation unit 1073 modulates the coding bits h$_i$ input from the coding unit 1071 to generate modulation symbols, performs DFT of the modulation symbols to generate the PUSCH/sPUSCH signal, and further outputs the PUSCH/sPUSCH signal processed by DFT to the multiplexing unit 1077.

The PUCCH generation unit 1075 generates a PUCCH/sPUCCH signal based on the coding bits q$_i$/g$_i$ and/or SR input from the coding unit 1071, and outputs the generated PUCCH/sPUCCH signal to the multiplexing unit 1077.

The uplink reference signal generation unit 10711 generates an uplink reference signal and outputs the generated uplink reference signal to the multiplexing unit 1077.

In accordance with the control signal input from the control unit 103, the multiplexing unit 1077 multiplexes the signal input from the PUSCH generation unit 1073 and/or the signal input from the PUCCH generation unit 1075 and/or the uplink reference signal input from the uplink reference signal generation unit 10711 to the uplink resource elements for each transmit antenna port.

The radio transmitting unit 1077 performs Inverse Fast Fourier Transform (IFFT) of a signal resulting from the multiplexing, performs modulation in compliance with an SC-FDMA scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and performs an output to the transmit and/or receive antenna 109 for transmission.

A configuration of the base station apparatus 3 of the present invention will be described below.

Figure 10:
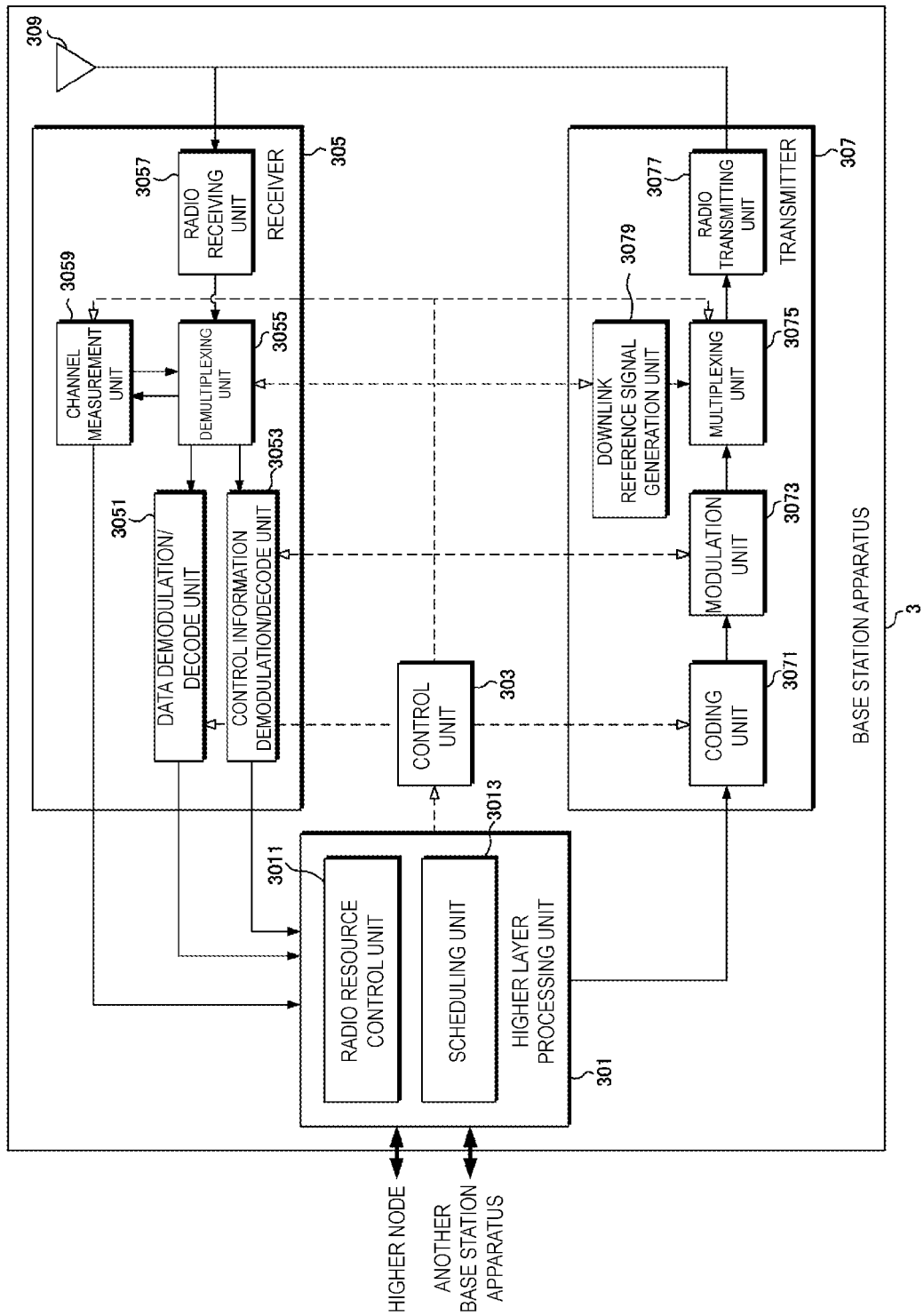
FIG. 10 is a schematic block diagram illustrating a configuration of a base station apparatus 3 according to the present invention.

FIG. 10 is a schematic block diagram illustrating a configuration of the base station apparatus 3 according to the present invention. As is illustrated, the base station apparatus 3 is configured to include a higher layer processing unit 301, a control unit 303, a receiver 305, a transmitter 307, and a transmit and/or receive antenna 309. The higher layer processing unit 301 is configured to include a radio resource control unit 3011 and a scheduling unit 3013. The receiver 305 is configured to include a data demodulation/decoding unit 3051, a control information demodulation/decoding unit 3053, a demultiplexing unit 3055, a radio receiver 3057, and a channel measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the control unit 303.

The radio resource control unit 3011 included in the higher layer processing unit 301 generates, or acquires from a higher node, the downlink data to be allocated in the downlink PDSCH, the RRC signal, and the MAC Control Element (CE), and performs an output to the HARQ control unit 3013. Furthermore, the radio resource control unit 3011 manages various kinds of configuration information for each of the mobile station apparatuses 1. For example, the radio resource control unit 3011 performs management of the serving cell configured for the mobile station apparatus 1, and the like.

The scheduling unit 3013 included in the upper layer processing unit 301 manages the radio resource of PUSCH and PUCCH to be allocated to the mobile station apparatus 1. In a case that the radio resource of the PUSCH is allocated to the mobile station apparatus 1, the scheduling section 3013 generates an uplink grant for indicating the allocation of the radio resource of the PUSCH, and outputs the generated uplink grant to the transmitter 307.

The control unit 303 generates a control signal for controlling the receiver 305 and the transmitter 307 based on the control information from the higher layer processing unit 301. The control unit 303 outputs the generated control signal to the receiver 305 and the transmitter 307 to control the receiver 305 and the transmitter 307.

The receiver 305, in accordance with the control signal input from the control unit 303, demultiplexes, demodulates, and decodes the reception signal received from the mobile station apparatus 1 through the transmit and/or receive antenna 309, and outputs the decoded information to the higher layer processing unit 301.

The radio receiver 3057 orthogonally demodulates the uplink signal received through the transmit and/or receive antenna 309 and converts the orthogonally demodulated analog signal to a digital signal. The radio receiver 3057 performs Fast Fourier Transform (FFT) of the digital signal, extracts a signal in the frequency domain, and performs an output to the demultiplexing unit 3055.

The demultiplexing unit 1055 demultiplexes the signal input from the radio receiving unit 3057 into a signal such as the PUCCH, the PUSCH, and the uplink reference signal. Note that, the demultiplexing is performed based on the allocation information of the radio resource that is determined by the radio resource control unit 3011 of the base station apparatus 3 in advance, and included in the uplink grant notified to each of the mobile station apparatuses 1. The demultiplexing unit 3055 performs compensation of channel for the PUCCH and the PUSCH based on the channel estimate input from the channel measurement unit 3059. Furthermore, the demultiplexing unit 3055 outputs the demultiplexed uplink reference signal to the channel measurement unit 3059.

The demultiplexing unit 3055 acquires the modulation symbol of the uplink data and the modulation symbol of the uplink control information (HARQ-ACK) from the PUCCH and PUSCH signals obtained by demultiplexing. The demultiplexing unit 3055 outputs the modulation symbol of the uplink data acquired from the signal of the PUSCH to the data demodulation/decoding unit 3051. The demultiplexing unit 3055 outputs the modulation symbol of the uplink control information (HARQ-ACK) acquired from the PUCCH signal or the PUSCH signal to the control information demodulation/decoding unit 3053.

The channel measurement unit 3059 measures the channel estimate, the channel quality, and the like, based on the uplink reference signal input from the demultiplexing unit 3055, and performs an output to the demultiplexing unit 3055 and the higher layer processing unit 301.

The data demodulation/decoding unit 3051 decodes the uplink data from the modulation symbol of the uplink data input from the demultiplexing unit 3055. The data demodulation/decoding unit 3051 outputs the decoded uplink data to the upper layer processing unit 301.

The control information demodulation/decoding unit 3053 decodes the HARQ-ACK from the HARQ-ACK modulation symbol input from the demultiplexing unit 3055. The control information demodulation/decoding unit 3053 outputs the decoded HARQ-ACK to the upper layer processing unit 301.

The transmitter 307 generates the downlink reference signal in accordance with the control signal input from the control unit 303, codes and modulates the downlink control information and the downlink data input from the higher layer processing unit 301, multiplexes the PDCCH, the PDSCH, and the downlink reference signal, and performs a transmission of signal to the mobile station apparatus 1 through the transmit and/or receive antenna 309.

The coding unit 3071 performs coding of the downlink control information and the downlink data input from the higher layer processing unit 301. The modulation unit 3073 modulates the coding bits input from the coding unit 3071 in compliance with the modulation scheme such as BPSK, QPSK, 16 QAM, or 64 QAM.

The downlink reference signal generation unit 3079 generates a downlink reference signal. The multiplexing unit 3075 multiplexes the modulation symbol of each channel and the downlink reference signal.

The radio transmitting unit 3077 performs Inverse Fast Fourier Transform (IFFT) of the multiplexed modulation symbol and the like, performs the OFDM modulation, generate a baseband digital signal, converts the baseband digital signal to an analog signal, generates an in-phase component and an orthogonal component of an intermediate frequency from the analog signal, removes frequency components unnecessary for the intermediate frequency band, converts (up-converts) the signal of the intermediate frequency to a signal of a high frequency, removes unnecessary frequency components, performs power amplification, and performs an output to the transmit and/or receive antenna 309 for transmission.

Each of the units included in the terminal apparatus 1 and the base station apparatus 3 may be configured as a circuit.

Figure 11:
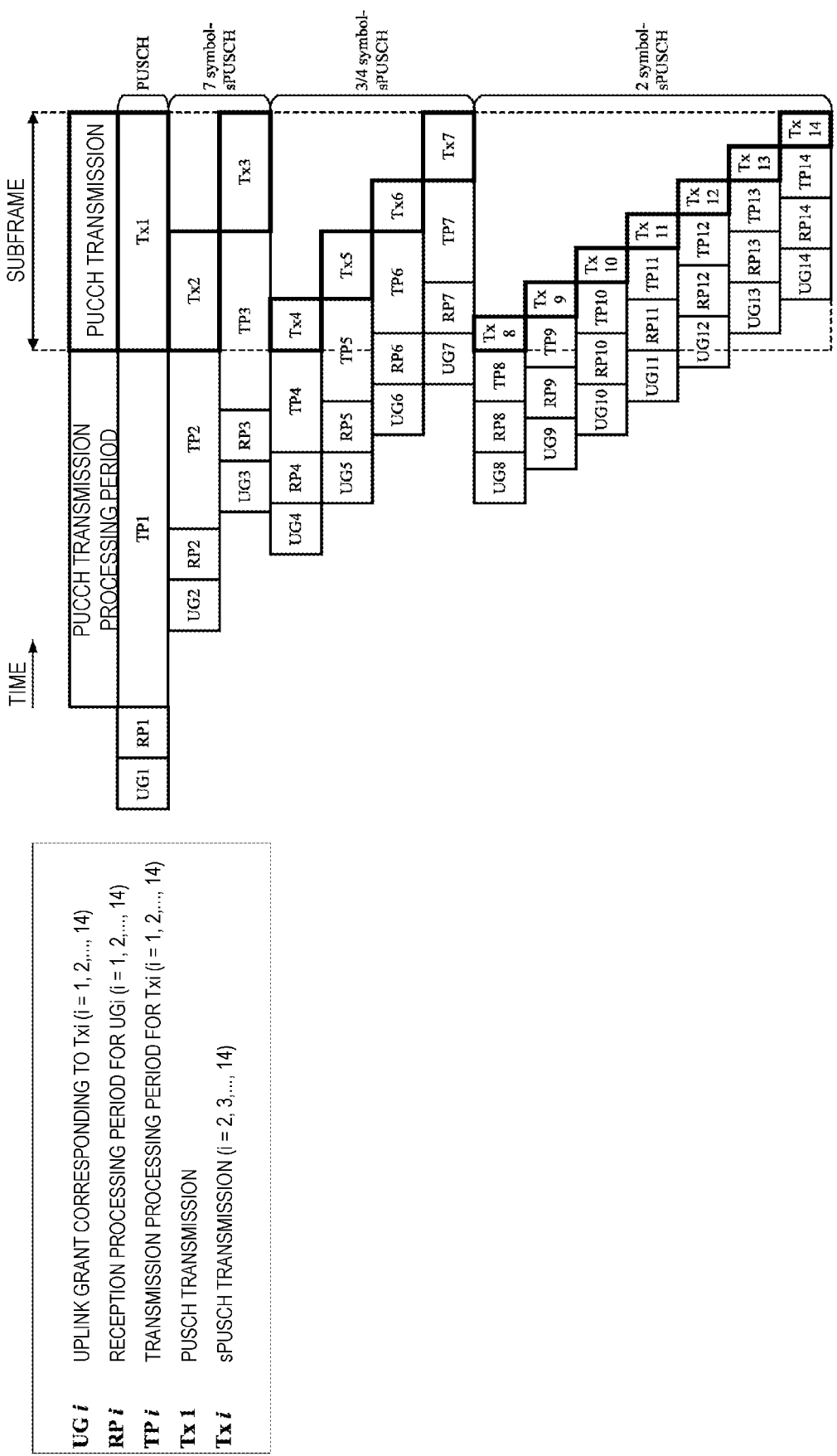
FIG. 11 is a diagram illustrating an example of processing period for a PUCCH/PUSCH/sPUSCH in the present embodiment.

FIG. 11 is a diagram illustrating an example of a processing period for PUCCH/PUSCH/sPUSCH in the present embodiment. In FIG. 11, the horizontal axis is a time axis. Tx1 is a PUSCH transmission. Tx2 to Tx14 are sPUSCH transmissions. Tx1 to Tx14 correspond to one subframe.

The PUCCH transmission processing period is a period during which transmission processing for a PUCCH transmission is performed. UGi is a PDCCH/sPDCCH including an uplink grant used for scheduling Txi. RPi is a period during which reception processing for UGi is performed. The terminal apparatus 1 decodes the PDCCH/sPDCCH including the uplink grant and checks the CRC (Cyclic Redundancy Check) at the RPi. The terminal apparatus 1 recognizes that detection of the PDCCH/sPDCCH addressed to the terminal apparatus 1 is successful based on a successful completion of the CRC check. The timing at which the terminal apparatus 1 recognizes successful detection may be different for each of the UG1 to UG14.

TPi is a period during which transmission processing for Txi is performed based on the received uplink grant. The length of TPi may be associated with the length of the corresponding Txi. The shorter the length of the corresponding Txi is, the shorter the length of TPi may be.

The transmission processing according to the present embodiment may include (i) coding processing, (ii) modulation symbol generation processing, (iii) discrete Fourier transform (Transform Precoding) processing, (iv) resource element multiplexing processing, (v) baseband signal generation processing, and the like.

The PUCCH transmission may be a transmission of uplink control information (periodic channel state information report and/or HARQ-ACK) using the PUCCH. The sPUCCH transmission may be a transmission of uplink control information (periodic channel state information report and/or HARQ-ACK) using the sPUCCH. A PUSCH transmission may be a transmission of a transport block using PUSCH. An sPUSCH transmission may be a transmission of a transport block using sPUSCH.

In a case that, in one serving cell (one carrier), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same SC-FDMA symbol", some of the transmissions may be dropped, at least, based on some or all of the following elements B to L.

In a case that, in one serving cell (one carrier), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same subframe", some of the transmissions may be dropped, at least, based on some or all of the following elements B to L.

The terminal apparatus 1 may drop a part of the transmission based on the difference between the two values for the two transmissions in the same element.

Element A: Cell index (ServCellIndex) of the serving cell in which a transmission is performed Element B: Bandwidth of a transmission Element C: Length of a transmission (number of SC-FDMA symbols)

Element D: SC-FDMA symbol in which a transmission starts

Element E: SC-FDMA symbol in which a transmission is terminated

Element F: Subcarrier spacing of a transmission

Element G: Value of the field included in the uplink grant corresponding to a PUSCH/sPUSCH transmission Element H: Size (number of bits) of the uplink data to be transmitted Element I: Coding rate of the uplink data to be transmitted Element J: Number of bits of the uplink control information to be transmitted Element K: Coding rate of the uplink control information to be transmitted Element L: Type of the uplink control information to be transmitted (HARQ-ACK, CSI, SR)

The transmission based on each of the elements A to F may include some or all of the PUCCH transmission, the sPUCCH transmission, the PUSCH transmission, the sPUSCH transmission, and the PDCCH/EPDCCH/sPDCCH transmission. Each of the transmissions base on the elements A to F may include transmissions of different channels. Each of the transmissions base on the elements A to Element F may include transmissions of the same channel. Here, the PDCCH/EPDCCH/sPDCCH transmission includes an uplink grant corresponding to the PUSCH/sPUSCH transmission.

The cell index is used to identify the serving cell. The cell index of the primary cell is "0". The cell index of the secondary cell is an integer greater than "0". The cell index of the secondary cell may be indicated by the information/parameter transmitted by the base station apparatus 3.

In a case that, in one serving cell (one carrier), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same SC-FDMA symbol", the channel to be used for transmitting uplink control information may be selected based on, at least, some or all of the above elements B to L. Here, the transmission other than the channel transmission including the uplink control information may not be dropped.

In a case that, in one serving cell (one carrier), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same subframe", the channel to be used for transmitting uplink control information may be selected based on, at least, some or all of the above elements B to L. Here, the transmission other than the channel transmission including the uplink control information may not be dropped.

In a case that, in a plurality of serving cells (a plurality of carriers), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same SC-FDMA symbol", some of the transmissions may be dropped based on, at least, some or all of the above elements A to L.

In a case that, in a plurality of serving cells (a plurality of carriers), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same subframe", some of the transmissions may be dropped based on, at least, some or all of the above elements A to L.

In a case that, in a plurality of serving cells (a plurality of carriers), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same SC-FDMA symbol", the channel to be used for transmitting the uplink control information may be selected based on, at least, some or all of the above elements A to L. Here, the transmission other than the channel transmission including the uplink control information may not be dropped.

In a case that, in a plurality of serving cells (a plurality of carriers), at least one of a plurality of transmissions of uplink control information using PUCCH, at least one of a plurality of transmissions of uplink control information using sPUCCH, at least one of a plurality of transmissions using PUSCH, and/or at least one of a plurality of transmissions using sPUSCH occur in the "same subframe", the channel to be used for transmitting the uplink control information may be selected based on, at least, some or all of the above elements A to L. Here, the transmission other than the channel transmission including the uplink control information may not be dropped.

An example of dropping/selecting a channel will be described below with reference to FIGS. 12 to 16.

Figure 12:
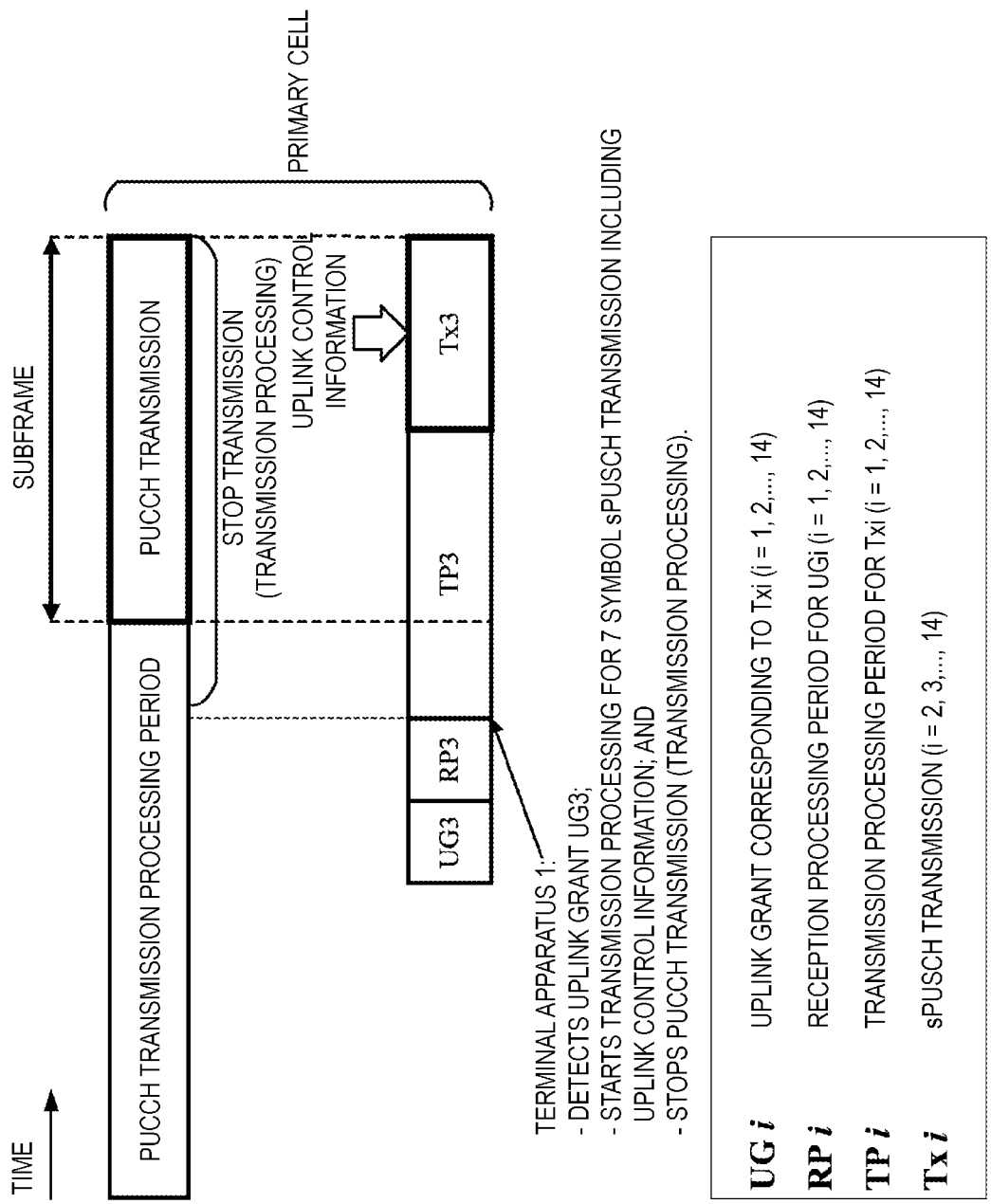
FIG. 12 is a diagram illustrating an example of dropping/selecting a channel according to the present embodiment.

FIG. 12 is a diagram illustrating an example of dropping/selecting a channel according to the present embodiment. In FIG. 12, a PUCCH transmission and 7 symbol sPUSCH transmission Tx3 are performed in the same subframe/the same SC-FDMA symbol in the primary cell. The terminal apparatus 1 may stop the PUCCH transmission processing after detecting the PDCCH/EPDCCH/sPDCCH including the uplink grant UG3 corresponding to the 7-symbol sPUSCH transmission Tx3. The terminal apparatus 1 may transmit the uplink control information corresponding to the PUCCH transmission using the 7-symbol sPUSCH transmission Tx3.

Figure 13:
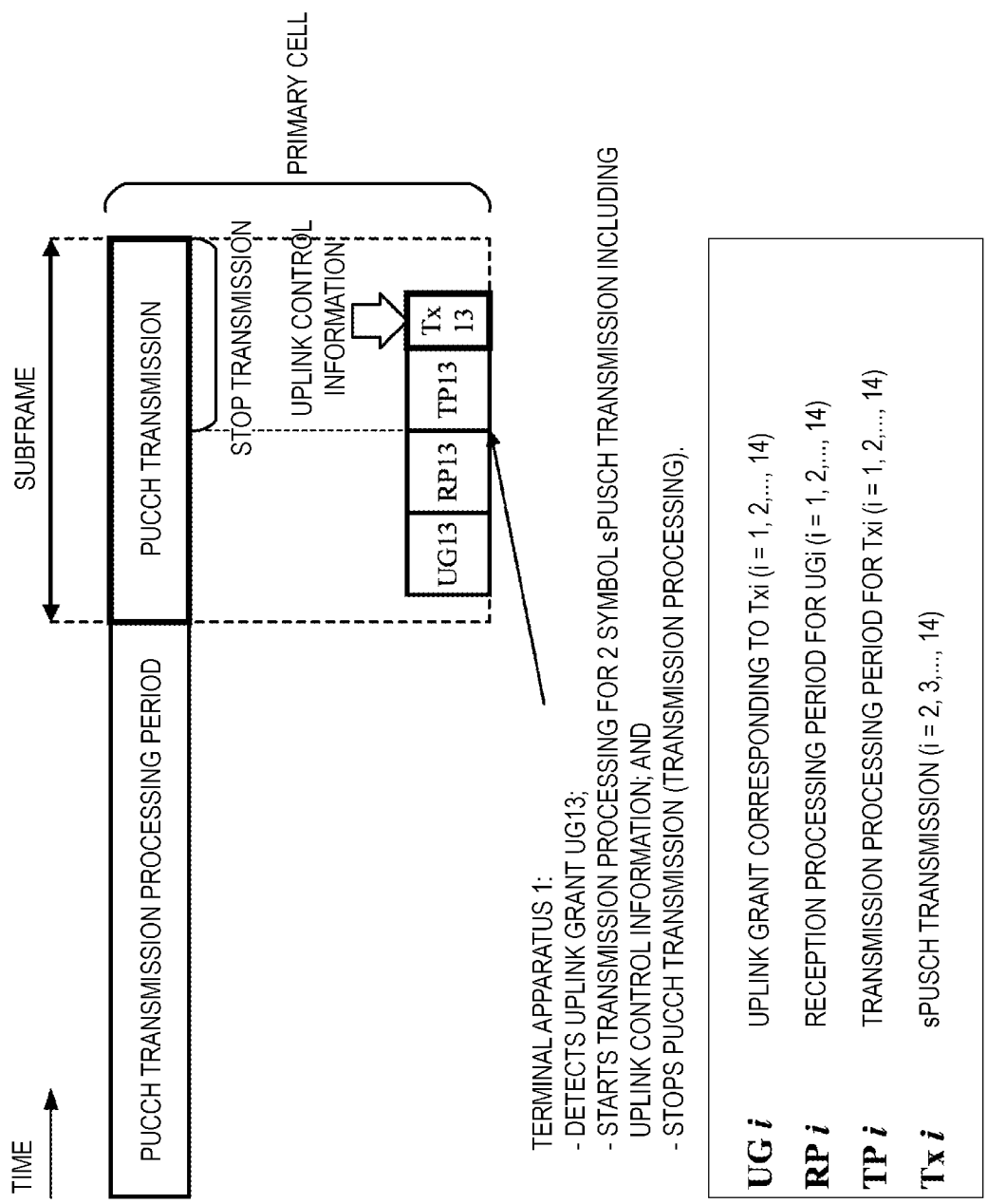
FIG. 13 is a diagram illustrating an example of dropping/selecting a channel according to the present embodiment.

FIG. 13 is a diagram illustrating an example of dropping/selecting a channel according to the present embodiment. In FIG. 13, a PUCCH transmission and 2 symbol sPUSCH transmission Tx13 are performed in the subframe/SC-FDMA symbol in the primary cell. The terminal apparatus 1 may stop the PUCCH transmission even in a case the PUCCH transmission has been started after detecting the PDCCH/EPDCCH/sPDCCH including the uplink grant UG13 corresponding to the 2-symbol sPUSCH transmission Tx13. The terminal apparatus 1 may transmit the uplink control information corresponding to the PUCCH transmission using the 2-symbol sPUSCH transmission Tx13. The terminal apparatus 1, even after the PUCCH transmission processing, may store the uplink control information before being encoded, until the PUCCH transmission is completed, in order to transmit uplink control information corresponding to the PUCCH transmission using the 2-symbol sPUSCH transmission Tx13. Alternatively, the terminal apparatus 1 may not transmit the uplink control information corresponding to the PUCCH transmission using the 2-symbol sPUSCH transmission Tx13.

Figure 14:
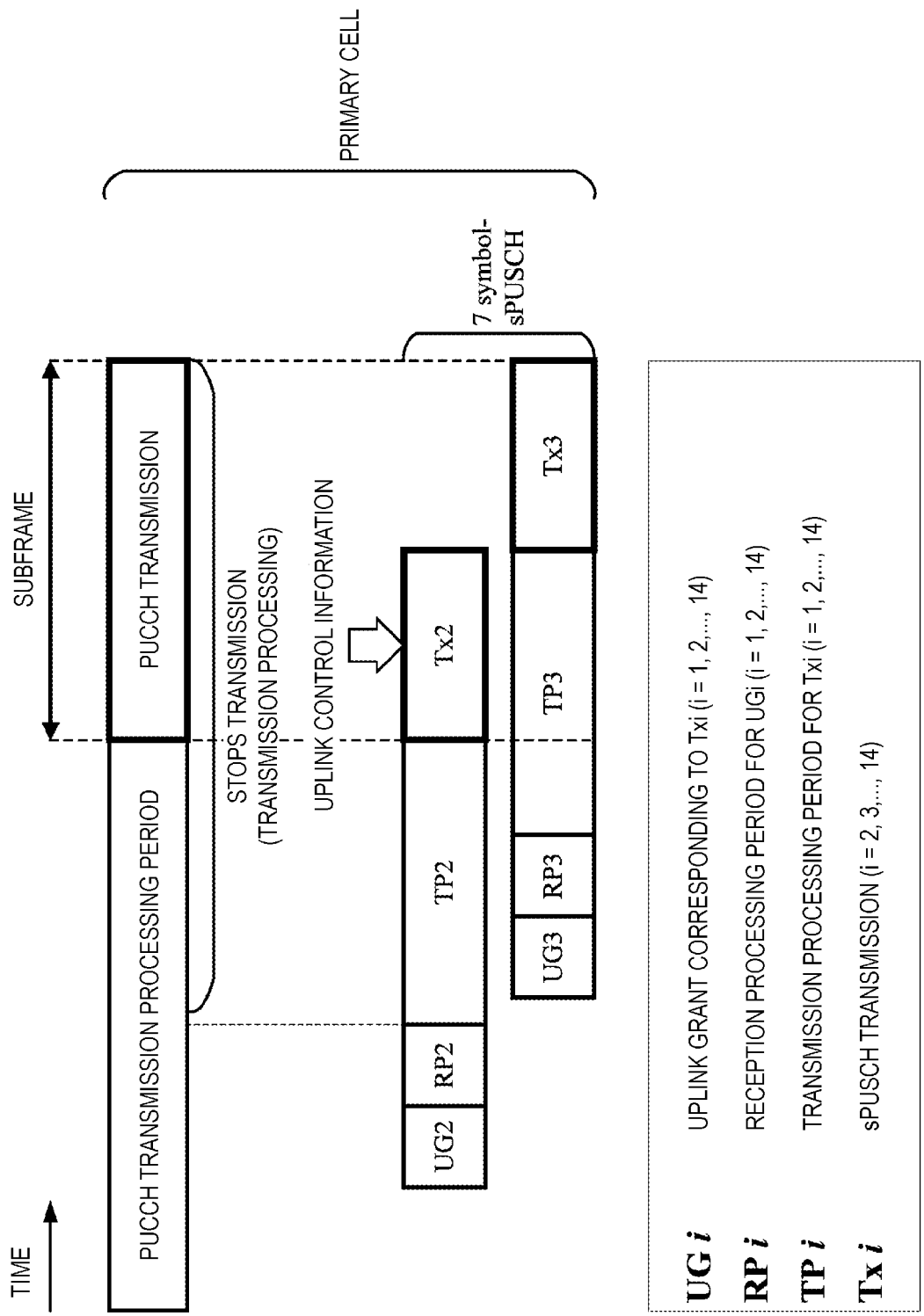
FIG. 14 is a diagram illustrating an example of dropping/selecting a channel according to the present embodiment.

FIG. 14 is a diagram illustrating an example of dropping/selecting a channel according to the present embodiment. In FIG. 14, in the subframe/SC-FDMA symbol in the primary cell, a PUCCH transmission, and 7 symbol sPUSCH transmissions Tx2 and Tx3 are performed. Here, 7 symbol sPUSCH transmissions Tx2 and Tx3 are not performed in the same SC-FDMA symbol. The terminal apparatus 1 may stop the PUCCH transmission processing after detecting the PDCCH/EPDCCH/sPDCCH including the uplink grant UG2 corresponding to the 7-symbol sPUSCH transmission Tx2. The terminal apparatus 1 may transmit the uplink control information corresponding to the PUCCH transmission using the 7-symbol sPUSCH transmission Tx2. The terminal apparatus 1, even in a case of detecting the PDCCH/EPDCCH/sPDCCH including the uplink grant UG3 corresponding to the 7-symbol sPUSCH transmission Tx3, does not transmit the uplink control information corresponding to the PUCCH transmission using the 7-symbol sPUSCH transmission Tx3. In order for the terminal apparatus 1 to stop transmitting the uplink control information using the 7-symbol sPUSCH transmission Tx2 after detecting the PDCCH/EPDCCH/sPDCCH including the uplink grant UG3 corresponding to the 7-symbol sPUSCH transmission Tx3, the processing of the multiplexing/interleaving unit 1071d needs to be re-executed for the transmission processing. However, there is not enough time to perform the transmission processing of the 7-symbol sPUSCH transmission Tx2 after detecting the PDCCH/EPDCCH/sPDCCH including the uplink grant UG3 corresponding to the 7-symbol sPUSCH transmission Tx3.

Namely, the terminal apparatus 1 may select a sPUSCH transmission Tx2 in a case that (i) the SC-FDMA symbol in which the 7-symbol sPUSCH transmission Tx2 is started is earlier than the SC-FDMA symbol in which the 7-symbol sPUSCH transmission Tx3 is started, (ii) the SC-FDMA symbol in which the 7-symbol sPUSCH transmission Tx2 is terminated is earlier than the SC-FDMA symbol in which the 7-symbol sPUSCH transmission Tx3 is terminated, (iii) the SC-FDMA symbol in which the PDCCH/EPDCCH/sPDCCH transmission including the uplink grant UG2 corresponding to a 7-symbol sPUSCH transmission Tx2 is started is earlier than the SC-FDMA symbol in which the PDCCH/EPDCCH/sPDCCH transmission including the uplink grant UG3 corresponding to the 7-symbol sPUSCH transmission Tx3 is started, and/or (iv) the SC-FDMA symbol in which the PDCCH/EPDCCH/sPDCCH transmission including the uplink grant UG2 corresponding to a 7-symbol sPUSCH transmission Tx2 is completed is earlier than the SC-FDMA symbol at which the PDCCH/EPDCCH/sPDCCH transmission including the uplink grant UG3 corresponding to a 7-symbol sPUSCH transmission Tx3 is completed. The terminal apparatus 1 may transmit the uplink control information (periodic channel state information report and/or HARQ-ACK) using the selected sPUSCH transmission Tx2.

Figure 15:
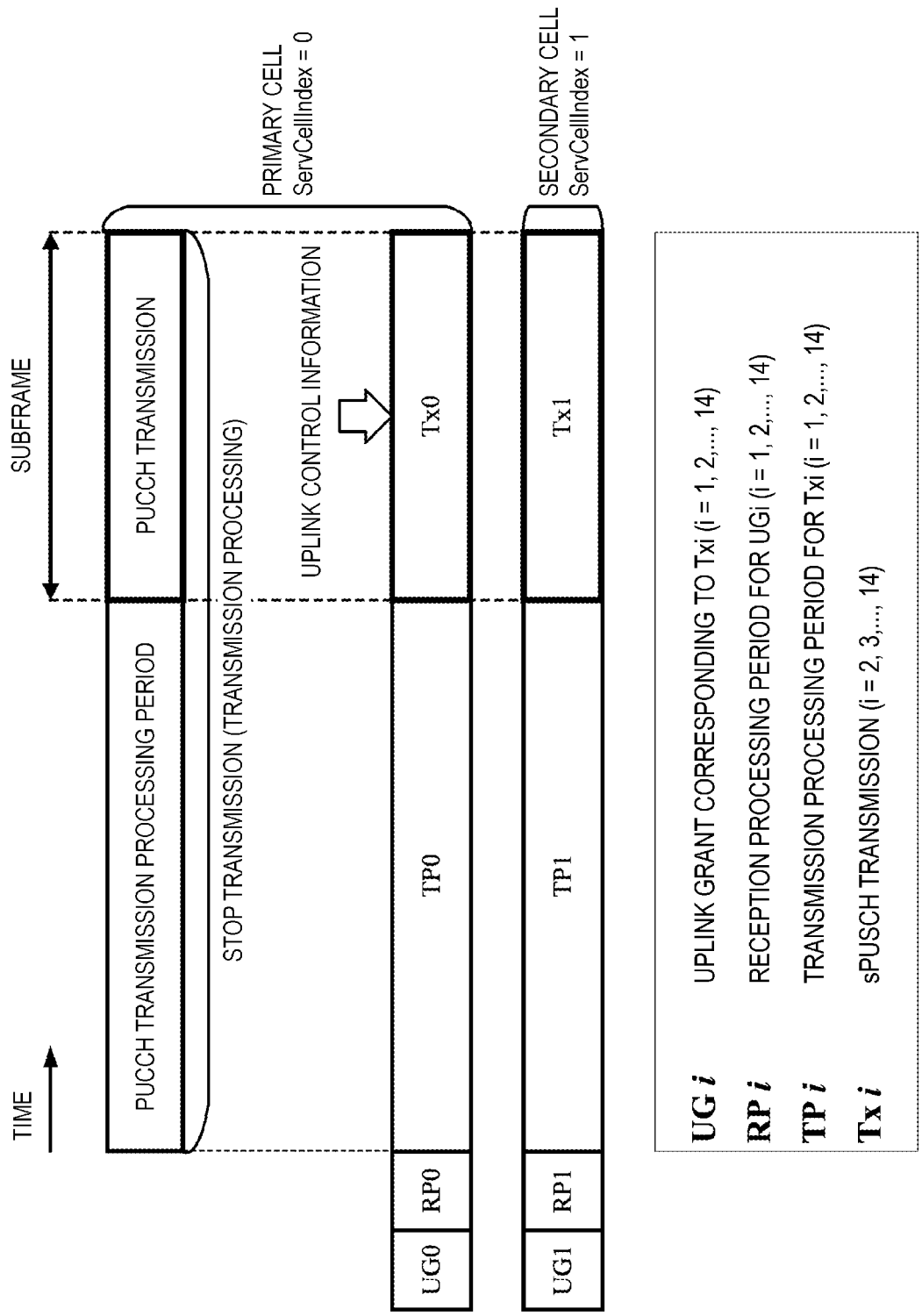
FIG. 15 is a diagram illustrating an example of dropping/selecting a channel according to the present embodiment.

FIG. 15 is a diagram illustrating an example of dropping/selecting a channel according to the present embodiment. In FIG. 15, a PUCCH transmission in the primary cell, a PUSCH transmission Tx0 in the primary cell, and a PUSCH transmission Tx3 in the primary cell are performed in the subframe/SC-FDMA symbol. In FIG. 15, a PUCCH transmission in the primary cell, a PUSCH transmission Tx0 in the primary cell, and a PUSCH transmission Tx3 in the primary cell are mapped to SC-FDMA symbols of the same index. After detecting the PDCCH/EPDCCH/sPDCCH including the uplink grant UG0 corresponding to the PUSCH transmission Tx0 and/or the PDCCH/EPDCCH/sPDCCH including the uplink grant UG1 corresponding to the PUSCH transmission Tx1, the terminal apparatus 1 may stop the PUCCH transmission process. The terminal apparatus 1 may select the PUSCH based on the cell index in a case that the uplink control information includes only periodic channel state information report and/or HARQ-ACK. For example, the terminal apparatus 1 may select the PUSCH transmission Tx0 in the primary cell with the smallest cell index. The terminal apparatus 1 may transmit the uplink control information (periodic channel state information report and/or HARQ-ACK) corresponding to the PUCCH transmission using the selected PUSCH transmission Tx0.

Namely, in a case that a plurality of PUSCH transmissions are performed in a subframe, the terminal apparatus 1 may select the PUSCH based on the cell index. The terminal apparatus 1 may transmit the uplink control information (periodic channel state information report and/or HARQ-ACK) using the selected PUSCH transmission.

Figure 16:
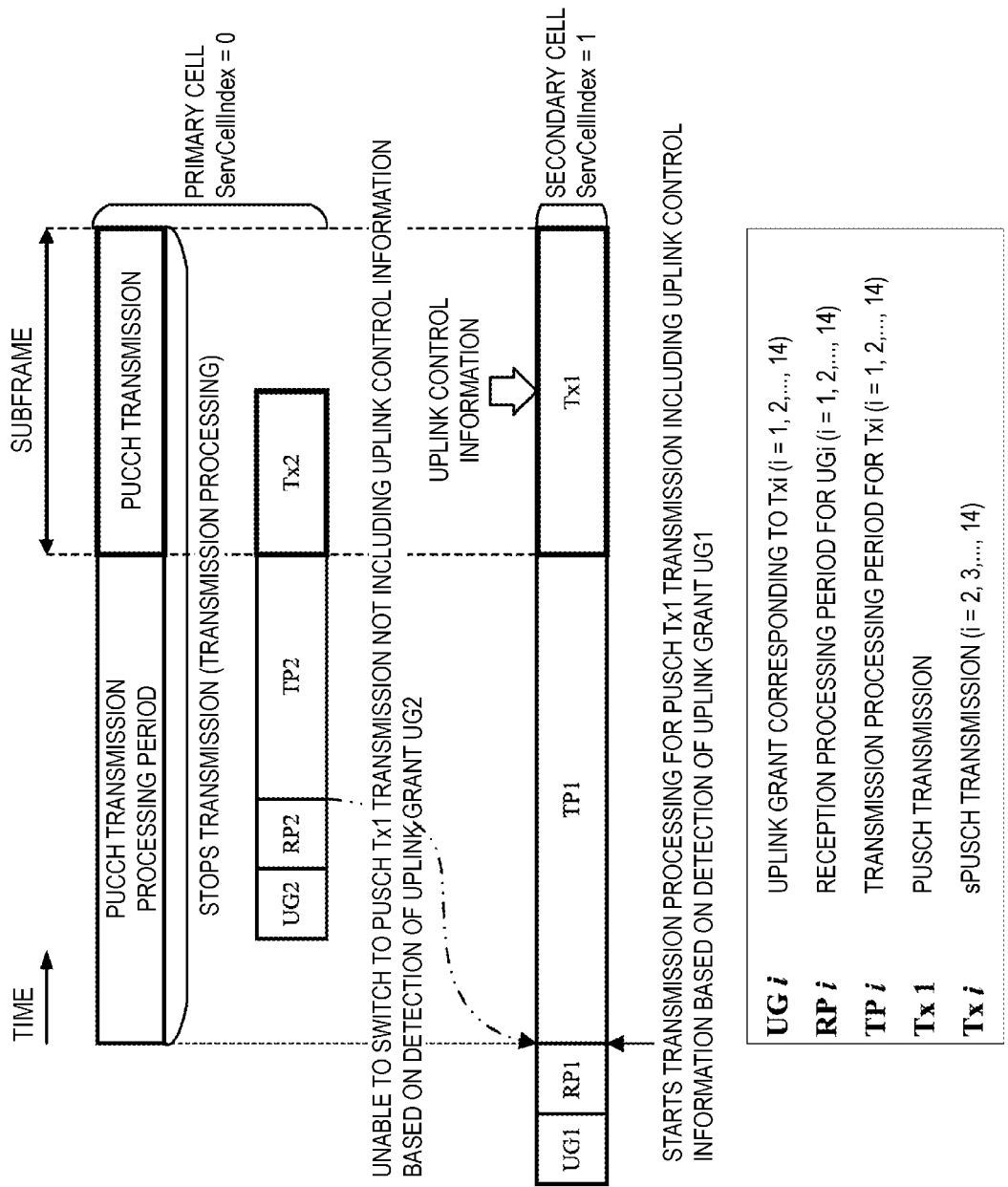
FIG. 16 is a diagram illustrating an example of dropping/selecting a channel according to the present embodiment.

FIG. 16 is a diagram illustrating an example of dropping/selecting a channel according to the present embodiment. In FIG. 16, a PUCCH transmission in the primary cell, a 7-symbol sPUSCH transmission Tx2 in the primary cell, and a PUSCH transmission Tx1 in the secondary cell are performed in the subframe/SC-FDMA symbol. In FIG. 16, the PUCCH transmission in the primary cell, the PUSCH transmission Tx0 in the primary cell, and the PUSCH transmission Tx3 in the primary cell start in the SC-FDMA symbol of the same index. The terminal apparatus 1 may stop the PUCCH transmission processing after detecting the PDCCH/EPDCCH/sPDCCH including the uplink grant UG1 corresponding to the PUSCH transmission Tx1. The terminal apparatus 1 may transmit the uplink control information corresponding to the PUCCH transmission using the PUSCH transmission Tx1. The terminal apparatus 1, even in a case that it detects the PDCCH/EPDCCH/sPDCCH including the uplink grant UG2 corresponding to the 7-symbol sPUSCH transmission Tx2, does not transmit the uplink control information corresponding to the PUCCH transmission using the 7-symbol sPUSCH transmission Tx2. In order for the terminal apparatus 1 to stop transmitting the uplink control information using the PUSCH transmission Tx1 after detecting the PDCCH/EPDCCH/sPDCCH including the uplink grant UG2 corresponding to the 7-symbol sPUSCH transmission Tx2, the processing of the multiplexing/interleaving unit 1071d needs to be re-executed for the transmission processing. However, there is not enough time to perform the transmission processing of the PUSCH transmission Tx 1 after detecting the PDCCH/EPDCCH/sPDCCH including the uplink grant UG2 corresponding to the 7-symbol sPUSCH transmission Tx2.

Namely, in a case that the PUSCH transmission and the sPUSCH transmission are performed in the subframe, the terminal apparatus 1 may select the PUSCH regardless of the cell index. The terminal apparatus 1 may transmit the uplink control information (periodic channel state information report and/or HARQ-ACK) using the selected PUSCH transmission. Namely, the terminal apparatus 1 may select the channel based on a length of the PUSCH transmission Tx1, a length of the 7-symbol sPUSCH transmission Tx2, the SC-FDMA symbol in which the PUSCH transmission Tx1 is started, and/or the SC-FDMA symbol in which the 7-symbol sPUSCH transmission Tx2 is started.

Here, in the examples of FIGS. 12 to 16, in a case that the uplink control information is SR, the terminal apparatus 1 may not transmit the uplink control information using X symbol sPUSCH transmissions or a PUSCH transmission.

Whether to drop the periodic channel state information report in the subframe in which the aperiodic channel state information report is performed may be determined based on, at least, some or all of the elements A to L. An example of aperiodic channel state information report in FIGS. 12 to 16 will be described below. The operations of FIGS. 12 to 16 described above will not be described below for the sake of simplicity of explanation.

In FIG. 12, in a case that the value of the field included in the uplink grant UG3 is set to trigger an aperiodic channel state information report, the periodic channel state information report may be dropped and an uplink control information including at least an aperiodic channel state information report may be transmitted using the 7 symbol sPUSCH transmission Tx3.

In FIG. 13, in a case that the value of the field included in the uplink grant UG13 is set to trigger an aperiodic channel state information report, the periodic channel state information report may be dropped and an uplink control information including at least an aperiodic channel state information report may be transmitted using the 2 symbol sPUSCH transmission Tx13.

In FIG. 14, in a case that the value of the field included in the uplink grant UG2 is set to trigger an aperiodic channel state information report, the periodic channel state information report may be dropped and an uplink control information including at least an aperiodic channel state information report may be transmitted using the 7 symbol sPUSCH transmission Tx2.

In FIG. 14, in a case that the value of the field of the uplink grant UG3 corresponding to the sPUSCH transmission Tx3 is set to trigger an aperiodic channel state information report, the terminal apparatus 1 may select the sPUSCH transmission Tx3, and transmit the uplink control information including at least an aperiodic channel state information report, using the selected PUSCH transmission Tx3. Here, the periodic channel state information report is not dropped. Namely, the uplink control information (periodic channel state information report and/or HARQ-ACK) corresponding to the PUCCH transmission may be transmitted using the 7 symbol sPUSCH transmission Tx2.

In FIG. 15, in a case that the value of the field included in the uplink grant UG0 is set to trigger an aperiodic channel state information report, the periodic channel state information report is dropped and the uplink control information including at least an aperiodic channel state information report may be transmitted using the PUSCH transmission Tx0.

In FIG. 15, in a case that the value of the field of the uplink grant UG1 corresponding to the PUSCH transmission Tx1 is set to trigger an aperiodic channel state information report, the terminal apparatus 1 may select the PUSCH transmission Tx1, and transmit the uplink control information (aperiodic channel state information report and/or HARQ-ACK) using the selected PUSCH transmission Tx1. Here, the periodic channel state information report is dropped. Namely, the uplink control information (periodic channel state information report and/or HARQ-ACK) corresponding to the PUCCH transmission is not transmitted using the PUSCH transmission Tx0.

In FIG. 16, in a case that the value of the field included in the uplink grant UG1 is set to trigger an aperiodic channel state information report, the periodic channel state information report may be dropped and the uplink control information including at least an aperiodic channel state information report may be transmitted using the PUSCH transmission Tx1.

In FIG. 16, in a case that the value of the field of the uplink grant UG2 corresponding to the sPUSCH transmission Tx2 is set to trigger an aperiodic channel state information report, the terminal apparatus 1 may select the sPUSCH transmission Tx2, and transmit the uplink control information including at least an aperiodic channel state information report, using the selected PUSCH transmission Tx2. Here, the periodic channel state information report is not dropped. Namely, the uplink control information (periodic channel state information report and/or HARQ-ACK) corresponding to the PUCCH transmission may be transmitted using 7 symbol sPUSCH transmission Tx1.

In the terminal apparatus 1 according to the present embodiment, simultaneous transmission of PUCCH and PUSCH is not configured. In a case that simultaneous transmission of PUCCH and PUSCH is configured, a process different from this embodiment may be applied.

Various aspects of the terminal apparatus 1 and the base station apparatus 3 according to the present embodiment will be described below.

(1) A first aspect of the present embodiment is a terminal apparatus 1, including a receiver 105 that receives a plurality of uplink grants to be used for scheduling a plurality of sPUSCHs in one subframe in one serving cell, and a transmitter 107 that transmits uplink control information using one of the plurality of sPUSCHs in which a transmission is first started.

(2) In the first aspect of the present embodiment, uplink data not including uplink control information is transmitted using the plurality of sPUSCHs excluding the one sPUSCH of the plurality of sPUSCHs in which a transmission is first started.

(3) In the first aspect of the present embodiment, the plurality of sPUSCHs are not transmitted simultaneously.

(4) In the first aspect of the present embodiment, the uplink control information includes a periodic channel state information report and/or HARQ-ACK.

(5) A second aspect of the present embodiment is a base station apparatus 3, including a transmitter 307 that transmits a plurality of uplink grants to be used for scheduling a plurality of sPUSCHs in one subframe in one serving cell, and a receiver 305 that receives uplink control information using one of the plurality of sPUSCHs in which a transmission is first started.

(6) In the second aspect of the present embodiment, uplink data not including uplink control information is received using the plurality of sPUSCHs excluding the one sPUSCH of the plurality of sPUSCHs in which a transmission is first started.

(7) In the second aspect of the present embodiment, the plurality of sPUSCHs are not simultaneously received.

(8) In the second aspect of the present embodiment, the uplink control information includes a periodic channel state information report and/or HARQ-ACK.

(9) A third aspect of the present embodiment is a terminal apparatus 1, including a receiver 105 that receives an uplink grant to be used for scheduling a PUSCH and an uplink grant to be used for scheduling an sPUSCH, and a transmitter 107 that transmits uplink control information using the PUSCH and/or the sPUSCH, wherein in a first case that the sPUSCH is transmitted in a primary cell in a first subframe, and the PUSCH is transmitted in a secondary cell in the first subframe, the transmitter 107 transmits the uplink control information using the PUSCH in the secondary cell in the first subframe.

(10) In the third aspect of the present embodiment, the transmitter 107 transmits, in a second case that a PUSCH is transmitted in the primary cell in a second subframe, and a PUSCH is transmitted in the secondary cell in the second subframe, the uplink control information using the PUSCH in the primary cell in the second subframe.

(11) In the third aspect of the present embodiment, the cell index of the primary cell is '0' and the cell index of the secondary cell is an integer greater than '0'.

(12) In the third aspect of the present embodiment, the uplink control information includes a periodic channel state information report and/or HARQ-ACK.

(13) In the third aspect of the present embodiment, in the first case, an aperiodic channel state information report performed using the sPUSCH in the primary cell in the first subframe causes the periodic channel state information report not to be dropped, and an aperiodic channel state information report performed using the PUSCH in the secondary cell in the first subframe causes the periodic channel state information report to be dropped.

(14) In the third aspect of the present embodiment, in the second case, an aperiodic channel state information report performed using the PUSCH in the primary cell in the second subframe causes the periodic channel state information report to be dropped, and an aperiodic channel state information report performed using the PUSCH in the secondary cell in the second subframe causes the periodic channel state information report to be dropped.

(15) A fourth aspect of the present embodiment is a base station apparatus 3, including a transmitter 307 that transmits an uplink grant to be used for scheduling a PUSCH and an uplink grant to be used for scheduling an sPUSCH, and a receiver 305 that receives uplink control information using the PUSCH and/or the sPUSCH, wherein the receiver 305 receives, in a first case that the sPUSCH is received in a primary cell in a first subframe, and the PUSCH is received in a secondary cell in the first subframe, the uplink control information using the PUSCH in the secondary cell in the first subframe.

(16) In the fourth aspect of the present embodiment, the receiver 305 receives, in a second case that the PUSCH is received in the primary cell in the second subframe, and the PUSCH is received in the secondary cell in the second subframe, the uplink control information using the PUSCH in the primary cell in the second subframe.

(17) In the fourth aspect of the present embodiment, the cell index of the primary cell is '0', and the cell index of the secondary cell is an integer greater than '0'.

(18) In the fourth aspect of the present embodiment, the uplink control information includes a periodic channel state information report and/or HARQ-ACK.

(19) In the fourth aspect of the present embodiment, in the first case, an aperiodic channel state information report performed using the sPUSCH in the primary cell in the first subframe causes the periodic channel state information report not to be dropped, and an aperiodic channel state information report performed using the PUSCH in the secondary cell in the first subframe causes the periodic channel state information report to be dropped.

(20) In the fourth aspect of the present embodiment, in the second case, an aperiodic channel state information report performed using the PUSCH in the primary cell in the second subframe causes the periodic channel state information report to be dropped, and an aperiodic channel state information report performed using the PUSCH in the secondary cell in the second subframe causes the periodic channel state information report to be dropped.

(21) A fifth aspect of the present embodiment is a terminal apparatus 1, including, a receiver 105 that receives a plurality of uplink grants to be used for scheduling a plurality of sPUSCHs in one subframe in one serving cell, and a transmitter 107 that performs a periodic channel state information report using, in the one subframe, one of the plurality of sPUSCHs in which a transmission is first started, wherein in a case that a value of a field of one of the plurality of uplink grants is set to trigger an aperiodic channel state information report, the transmitter 107 performs the aperiodic channel state information report using one of the plurality of sPUSCHs that corresponds to the one of the plurality of uplink grants, and in a case that one of the plurality of sPUSCHs corresponding to the one of the plurality of uplink grants is the one of the plurality of sPUSCHs in which the transmission is first started, the periodic channel state information report is dropped, and in a case that one of the plurality of sPUSCHs corresponding to the one of the plurality of uplink grants is not the one of the plurality of sPUSCHs in which the transmission is first started, the periodic channel state information report is not dropped.

(22) A sixth aspect of the present embodiment is a base station apparatus 3, including, a transmitter 307 that transmits a plurality of uplink grants to be used for scheduling a plurality of sPUSCHs in one subframe in one serving cell, and a receiver 305 that receives a periodic channel state information report using, in the one subframe, one of the plurality of sPUSCHs in which a transmission is first started, wherein in a case that a value of a field of one of the plurality of uplink grants is set to trigger an aperiodic channel state information report, the receiver 305 receives the aperiodic channel state information report using one of the plurality of sPUSCHs that corresponds to the one of the uplink grants, and in a case that one of the plurality of sPUSCHs corresponding to the one of the plurality of uplink grants is the one of the plurality of sPUSCHs in which the transmission is first started, the periodic channel state information report is dropped, and in a case that one of the plurality of sPUSCHs corresponding to the one of the plurality of uplink grants is not the one of the plurality of sPUSCHs in which the transmission is first started, the periodic channel state information report is not dropped.

This allows the terminal apparatus to efficiently transmit the uplink control information. In addition, this allows the base station apparatus to efficiently receive the uplink control information.

Each of a program running on a base station apparatus 3 and a terminal apparatus 1 according to the present invention may be a program that controls a Central Processing Unit (CPU) and the like, such that the program causes a computer to operate in such a manner as to realize the functions of the above-described embodiment according to the present invention. The information handled in these apparatuses is temporarily accumulated in a Random Access Memory (RAM) while being processed, and thereafter, the information is stored in various types of Read Only Memory (ROM) such as a flash ROM and a Hard Disk Drive (HDD), and read by the CPU to be modified or rewritten, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

CROSS-REFERENCE OF RELATED APPLICATION

This application claims the benefit of priority to JP 2016-080159 filed on Apr. 13, 2016, which is incorporated herein by reference in its entirety.

REFERENCE SIGNS LIST 1 (1A, 1B, 1C) Terminal apparatus
3 Base station apparatus
101 Higher layer processing unit
103 Control unit
105 Receiver
107 Transmitter
301 Higher layer processing unit
303 Control unit
305 Receiver
307 Transmitter
1011 Radio resource control unit
1013 Scheduling unit
3011 Radio resource control unit
3013 Scheduling unit

The invention claimed is:
1. A terminal apparatus comprising:
in a case that a collision between a transmission of a physical uplink control channel (PUCCH) with uplink control information including a scheduling request and a hybrid automatic repeat request acknowledgement (HARQ-ACK) response in a subframe in a primary cell and a transmission of a shortened physical uplink sharing channel (sPUSCH) in the subframe in the primary cell happens,
a transmitter configured not to transmit, in the sPUSCH and the PUCCH, the scheduling request included in the uplink control information,
the transmitter configured not to transmit, in the PUCCH, the HARQ-ACK response included in the uplink control information, and
the transmitter configured to transmit, in the sPUSCH, the HARQ-ACK response included in the uplink control information, wherein
the sPUSCH is mapped to an sTTI (shortened Transmission Time Interval) in the subframe, and the sTTI comprises two, three or seven SC-FDMA symbols, and the subframe comprises fourteen SC-FDMA symbols.

2. A base station apparatus comprising:

in a case that a collision between a reception of a physical uplink control channel (PUCCH) with uplink control information including a scheduling request and a hybrid automatic repeat request acknowledgement (HARQ-ACK) response in a subframe in a primary cell and a reception of a shortened physical uplink shared channel (sPUSCH) in the subframe in the primary cell happens, a receiver configured not to receive, in the sPUSCH and the PUCCH, the scheduling request included in the uplink control information, the receiver configured not to receive, in the PUCCH, the HARQ-ACK response included in the uplink control information, and the receiver configured to receive, in the sPUSCH, the HARQ-ACK response included in the uplink control information, wherein the sPUSCH is mapped to an sTTI (shortened Transmission Time Interval) in the subframe, and the sTTI comprises two, three or seven SC-FDMA symbols, and the subframe comprises fourteen SC-FDMA symbols.

3. A communication method used for a terminal apparatus, the method comprising:

in a case that a collision between a transmission of a physical uplink control channel (PUCCH) with uplink control information including a scheduling request and a hybrid automatic repeat request acknowledgement (HARQ-ACK) response in a subframe in a primary cell and a transmission of a shortened physical uplink shared channel (sPUSCH) in the subframe in the primary cell happens, not transmitting, in the sPUSCH and the PUCCH, the scheduling request included in the uplink control information, not transmitting, in the PUCCH, the HARQ-ACK response included in the uplink control information, and transmitting, in the sPUSCH, the HARQ-ACK response included in the uplink control information, wherein the sPUSCH is mapped to an sTTI (shortened Transmission Time Interval) in the subframe, and the sTTI comprises two, three or seven SC-FDMA symbols, and the subframe comprises fourteen SC-FDMA symbols.

4. A communication method used for a base station apparatus, the method comprising:

in a case that a collision between a reception of a physical uplink control channel (PUCCH) with uplink control information including a scheduling request and a hybrid automatic repeat request acknowledgement (HARQ-ACK) response in a subframe in a primary cell and a reception of a shortened physical uplink shared channel (sPUSCH) in the subframe in the primary cell happens, not receiving, in the sPUSCH and the PUCCH, the scheduling request included in the uplink control information, not receiving, in the PUCCH, the HARQ-ACK response included in the uplink control information, and receiving, in the sPUSCH, the HARQ-ACK response included in the uplink control information, wherein the sPUSCH is mapped to an sTTI (shortened Transmission Time Interval) in the subframe, and the sTTI comprises two, three or seven SC-FDMA symbols, and the subframe comprises fourteen SC-FDMA symbols.

* * * * *